United States Patent [19]

Fleishman

[11] 4,232,313
[45] Nov. 4, 1980

[54] TACTICAL NAGIVATION AND COMMUNICATION SYSTEM

[75] Inventor: Herman B. Fleishman, Millington, N.J.

[73] Assignee: The United States of America as represented by the Secretary of the Navy, Washington, D.C.

[21] Appl. No.: 293,259

[22] Filed: Sep. 22, 1972

[51] Int. Cl.³ .................... G01S 13/00; G01S 3/02; G01C 21/00
[52] U.S. Cl. ..................... 343/6 R; 343/6.5 R; 343/112 TC; 343/7.6; 364/452; 364/453; 364/460
[58] Field of Search ............... 235/150, 23, 24, 25–27; 343/6 R, 112 TC, 6.5 R, 7.6; 364/460, 452, 453

[56] References Cited

U.S. PATENT DOCUMENTS

| | | | |
|---|---|---|---|
| 3,214,575 | 10/1965 | Seliger et al. | 250/135.25 |
| 3,434,140 | 3/1969 | Chisholm | 343/112 TC |

*Primary Examiner*—Stephen C. Buczinski
*Attorney, Agent, or Firm*—R. S. Sciascia; Henry Hansen

[57] ABSTRACT

Method and apparatus are provided for the tactical nagivation and communication of a community of aircraft. Each of the aircraft in the community is provided with an inertial navigation system capable of providing accurate short term navigational information and a time synchronized ranging system capable of providing accurate long term navigational information. One of the aircraft is designated as the airborne control unit and establishes a relative grid coordinate system within which the community of aircraft operate. The origin of the relative grid is established by the airborne control unit. When stationary ground time synchronized ranging system units are present, highly accurate georeferenced information may be supplied to the airborne control unit by operation of its time synchronized ranging system. When such ground units are not present, accurate georeferenced information may be obtained by the airborne controller from navigational systems such as satellite, Loran or Omega systems. The remaining or "user" aircraft in the community determine their position in the relative grid by interrogating the airborne control unit with their time synchronized ranging systems. A Kalman filter technique is employed to update the short term navigational information derived from the inertial navigation system in each user aircraft with the long term navigational information obtained from the time synchronized ranging system, so that the highly accurate georeferenced navigational information from the airborne control unit is provided to each member of the community of user aircraft. Novel computer programming permits each aircraft in the community to derive navigational information having the best characteristics of navigational information available from several sources, so that very accurate navigation in the area defined by the relative grid is made possible. The system of the invention may also perform communication and identification functions for the members of the tactical community.

17 Claims, 14 Drawing Figures

RELATIVE GRID DEFINITION – OFFSET GRID OPTION

TEMPORARY RELATIVE GRID GEOMETRY

PROJECTED TRIANGLE ON $U_T$ $V_T$ PLANE

USER TSRS ACQUISITION GEOMETRY

SINGLE AIRCRAFT UPDATE MODE
USER ACTIVE (SYNCHRONIZED)

TWO AIRCRAFT UPDATE MODE
USER ACTIVE (SYNCHRONIZED)

TACTICAL NAVIGATION AND COMMUNICATION SYSTEM

The invention herein described was made in the course of or under a contract, or subcontract thereunder with the Department of the Navy

BACKGROUND OF THE INVENTION

1. Field of the Invention

This invention relates to navigation and communication systems and more particularly to method and apparatus for tactical navigation, communication and identification of a community of aircraft operating in a defined area.

2. Description of the Prior Art

There are several major types of aircraft navigation systems in use at the present time. Each of these types possesses inherent advantages and limitations which render that type suitable for particular applications. The so-called "inertial navigation systems" provide highly accurate aircraft attitude and acceleration information which enable the position of an aircraft to be located by a "dead reckoning" method of navigation. This system utilizes a gyroscopically stabilized platform having three axis accelerometers mounted thereon. The stable platform provides a set of reference axes to which the aircraft azimuth, pitch and roll are compared to provide measurements of the actual attitude of the aircraft. The velocity of the aircraft along each of the three axes are obtained by integrating the accelerometer output signals. When coordinates representing the initial or starting position of the aircraft are fed into the system, this arrangement provides excellent navigation information for aircraft navigation in a defined area of the earth's surface permitting the actual location of the aircraft to be determined without reference to other systems. However, the gyroscopically stabilized platform is subject to drift and other errors which render the system suitable for short term use only.

Radio navigation systems such as Loran, Tacan, and Omega supply georeferenced positional information to an aircraft so that the position of the aircraft on the earth's surface may be determined with a fair degree of accuracy. The Loran and Omega systems are so-called "hyperbolic systems" wherein the position of the aircraft along two intersecting hyperbolic lines is determined by measuring the time delay of transmitted radio signals from two pairs of stations located on the earth's surface. The Tacan system is a so-called "rho-theta system" which provides range and bearing information for the aircraft with respect to a plurality of radio beacons. Although systems of this type provide stable, long term georeferenced navigational information, the information supplied is of a lower order of accuracy for short term use than that obtained from inertial navigation systems. Furthermore, it is difficult to provide global coverage systems of this type without establishing an extensive chain of transmitting stations.

The third major type of navigation system is the so-called "satellite system". In this type of system, a plurality of radio wave transmitting satellites are caused to circle the earth at predetermined times and in predetermined orbits so that measurement of the radio waves from the satellites permits an aircraft or other space vehicle to determine its three dimensional position and velocity with respect to the earth's surface. Although this type of navigation system facilitates global coverage and provides position and velocity accuracy which is geometry sensitive and growth bounded, the short term accuracy of the navigational information supplied is of a lower order than that obtainable from the inertial systems or radio navigation systems. Additionally, a system user must be supplied with complex and expensive receiving equipment which renders the system prohibitively expensive for tactical navigation in a defined area.

From the foregoing discussion, it is believed apparent that none of the major types of navigational systems in present day use meets all of the requirements of a given application. Furthermore, an aircraft engaged in a tactical mission in a defined area on the earth's surface does not require the expensive and bulky equipment needed for satisfactory long range navigation, while an aircraft engaged in a long distance flight does not need the high degree of positional accuracy which an aircraft may require during takeoff or landing. In military and naval applications, "tactical" operations are often conducted by aircraft and ships in a limited or defined area on the earth's surface. During the course of these operations, many different aircraft and ships may be engaged in missions in the tactical area and consequently, positional and velocity information for each aircraft and ship in the operating "community" must be known with a high degree of accuracy to permit the close coordination of action required by modern military practice. For example, it is extremely important that aircraft in the tactical community engaged in reconnaissance and close air support for ground troops be furnished with navigational information of a high order which permits ground positions to be ascertained with great accuracy.

Similar requirements are also imposed upon aircraft and ships engaged in many civilian operations, such as search and rescue operations, for example. For maximum efficiency and thorough coverage of the area being searched, the position and velocity of each aircraft and ship in the tactical search area should be known with respect to every other aircraft and ship in the area. When the object of the search is located by an aircraft, it is important that the aircraft be able to ascertain and communicate the exact position of the object to the other members of the search group. In both military and civilian tactical operations, it is, of course, desirable that the command and control functions be capable of being exercised by one or more of the aircraft in the community. It is also desirable that the command and control functions be readily shifted from one aircraft or ship in the community to another aircraft or ship without loss of accuracy or stored data. In some applications, it is desirable that the members of the tactical community be identified as belonging to the community before being allowed to participate in the navigational data available. An example of such identification functions would be the military IFF ("identification friend or foe"). Finally, in military tactical operations it is extremely desirable that the overall operation be monitored by the area command unit without the emission by the command unit of electromagnetic radiation of any kind which would lead the enemy to the location of the command unit.

A suitable navigation system should, of course, provide the required navigational information with the required degree of accuracy, should be of compact size and weight, and should contain a minimum number of components. The system should also exhibit operating flexibility, be self-contained, and be capable of use in a wide variety of aircraft, ships and other vehicles. Additionally, the system design should be such as to permit maximum use of existing navigation technology and also be flexible enough to permit use of navigation technology developed in the future without making substantial changes in the overall system.

SUMMARY OF THE INVENTION

It is an object of this invention to provide method and apparatus for navigation of aircraft and other vehicles operating in a tactical community which permits each aircraft or vehicle of the community to utilize navigational information of the highest order available to any aircraft or vehicle in the community.

It is a further object of this invention to provide method and apparatus for navigation in which the best navigational data available from several different navigation systems are combined to provide optimum navigational data and system performance.

It is a still further object of this invention to provide method and apparatus for aircraft, ship, or other vehicle navigation which permit simultaneous operation of the aircraft, ship, or other vehicle in two or more coordinate systems.

It is an additional object of this invention to provide method and apparatus for aircraft and ship navigation which provide both inertial navigation information and georeferenced navigation information to each user of the system.

It is an additional object of this invention to provide method and apparatus for aircraft navigation which permits an in-air alignment of the inertial navigation portion of the system.

It is a still further object of this invention to provide a vehicle navigation system which is also capable of performing communication, data storage and vehicle identification functions.

It is an additional object of this invention to provide a vehicle navigation system especially suitable for use in tactical operations involving a plurality of user aircraft, ships or other vehicles and wherein each of the system users may be an active or passive user.

It is a further object of this invention to provide novel computer programming for a computer in a navigation system wherein navigation signals are obtained from at least two different sources and wherein the said navigation signals are combined to produce optimum navigation signals having the best characteristics of each of the signals from the different sources.

Briefly, the navigation system of the invention contemplates a community of vehicles, including a control vehicle and at least one user vehicle, operating in a defined area. The control vehicle and all user vehicles are each equipped with an inertial navigation system and a time synchronized ranging system. The control vehicle may also be furnished with georeferenced navigational information which is employed to update its inertially-derived navigation information in a digital computer programmed with Kalman filter techniques. The "hybrid" navigational information thus derived is transmitted to each user vehicle by the time synchronized ranging system and the user vehicle employs the transmitted hybrid information to update its own inertially-derived navigation information using similar computer programming techniques.

For community navigation purposes, the control vehicle establishes a relative grid coordinate system covering the defined area. The control vehicle and each user vehicle periodically determine their relative positions in the relative grid by making radio range measurements using the time synchronized ranging system. The same system is employed by the control vehicle to transmit relative grid origin and alignment data to each user vehicle, thereby enabling each user vehicle to navigate in the relative grid system. The radio ranging system is also employed for the transmission of the hybrid navigational information to all system users and may be utilized for other communication functions, such as vehicle identification, for example.

The nature of the invention and other objects and additional advantages thereof will be more readily understood by those skilled in the art after consideration of the following detailed description taken in conjunction with the accompanying drawings.

DESCRIPTION OF THE PREFERRED EMBODIMENT OF THE INVENTION

Figure 1:
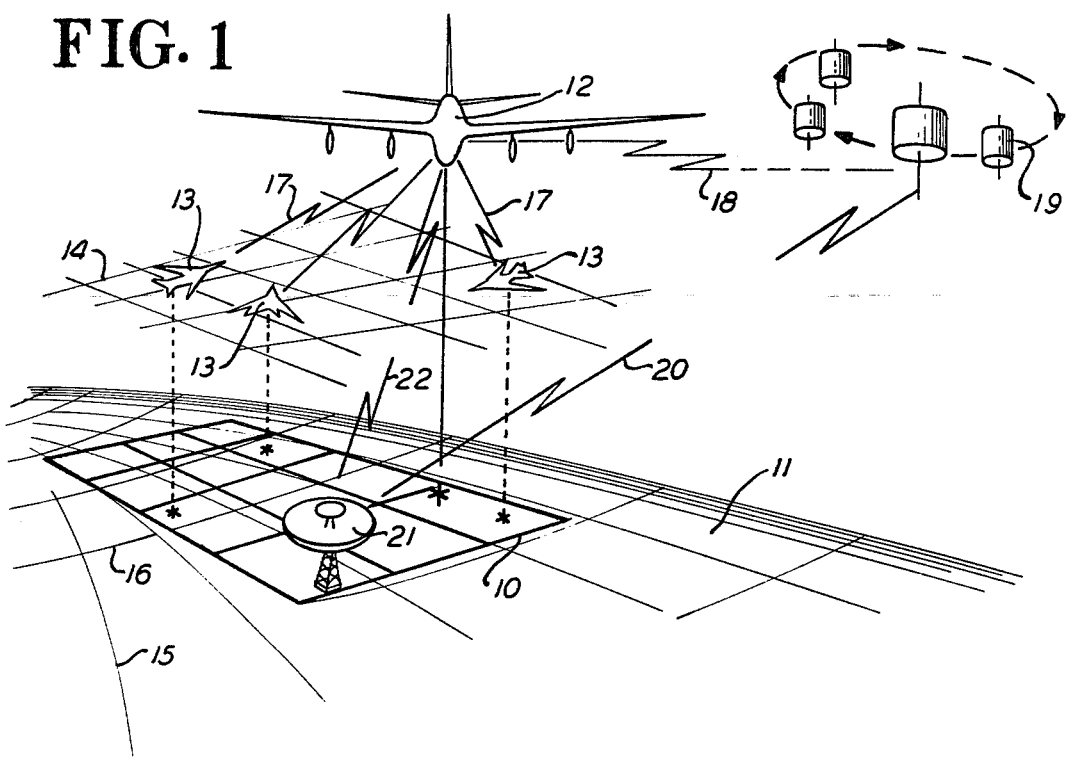
FIG. 1 is a schematic diagram of a community of aircraft in a tactical area served by the navigation and communication system of the invention.

Referring now to FIG. 1 of the drawings, there is shown a community of aircraft flying in a defined area 10 on the earth's surface 11. The community of aircraft comprises an airborne command and control unit 12 and a plurality of user aircraft 13 which are located in the defined area 10. A situation of this type often arises during the course of military operations when a plurality of aircraft are engaged in so-called "tactical" missions against the enemy in the battle area. When close air support is required for ground operations, it becomes vitally important that the aircraft operating in the tactical area be able to navigate to precisely defined locations in the tactical area, since an error in navigation could result in the bombing or strafing of the attacking aircraft's own ground troops. A somewhat similar situation arises during the course of civilian aircraft operations when search and rescue missions are undertaken. For example, when a plane is lost at sea or downed in a vast uninhabited area, the searching operations are usually conducted from the air by a community of aircraft and each aircraft in the community is assigned to a precisely defined search area. When the downed aircraft is sighted, it becomes necessary that the precise location of the downed aircraft be transmitted to helicopters, ships or ground rescue parties, so that rescue operations may be undertaken.

In order to engage in such tactical missions, each aircraft in the tactical community must fly to the defined tactical area and accordingly may be called upon to navigate over substantial portions of the earth's surface. Navigation of this type is usually accomplished by means of Loran or Omega systems which provide long range radio signals which are used to guide the aircraft to the desired geographic location. In some situations, a satellite navigation system may be employed which provides even a wider area of global coverage. With present navigation techniques, however, each aircraft in the tactical community must be equipped to receive the Loran, Omega or satellite signals to enable the aircraft to reach the defined tactical area. Once inside the tactical area, the requirements for the navigation system change, since the aircraft must now be able to navigate with a much higher degree of accuracy to reach its assigned targets or location. For this type of navigation, inertial navigation systems have been found to be very satisfactory since they are extremely sensitive and highly accurate over short periods of time and distance. Additionally, an inertial navigation system is ideally suited to follow the many and rapid course changes which an aircraft may be called upon to make in the tactical area. It will be apparent from the foregoing discussion that it would be prohibitively expensive to provide all of the user aircraft in the tactical community with both types of navigation systems. In military aircraft, the use of both types of navigation systems could easily exceed the size and weight limitations imposed upon such aircraft.

In accordance with the teachings of the present invention, the aircraft designated as the airborne control unit 12 is provided with means for initiating a relative grid coordinate system 14 in which the community of aircraft operate. The relative grid 14 may or may not be aligned with the meridians of longitude 15 and the parallels of latitude 16 on the surface of the earth. The relative grid coordinate system 14 is established by the control aircraft and radio signals 17 are transmitted from the airborne control unit 12 to each of the user aircraft 13. As will be hereinafter explained, the transmitted signals 17 from the control aircraft enable each of the user aircraft to determine its position in the relative grid and hence in relation to the defined area 10 on the earth's surface. In the system illustrated in FIG. 1 of the drawings, a radio data link 18 is established between the control aircraft 12 and a navigation satellite system 19, while a similar radio data link 20 is established between the satellite system 19 and a ground station 21. The control aircraft 12 is also coupled by a radio data link 22 to the ground station 21, so that the control aircraft is enabled to navigate by high-accuracy satellite navigation information. The present invention provides means for transmitting this high-accuracy satellite navigation information to each of the user aircraft 13 in the relative grid, so that the benefits of this navigational information are available to all aircraft in the community. When each user aircraft is provided with an inertial navigation system to enable it to navigate with the high, short term accuracy of such a system, the addition of the long term, georeferenced navigational information from the satellite system provides each user aircraft with optimum navigational information. Although the satellite system 19 is shown in FIG. 1 as the source of the highly-accurate, georeferenced navigation information, it is believed apparent that other systems, such as Loran or Omega, for example, could be employed.

Figure 2:
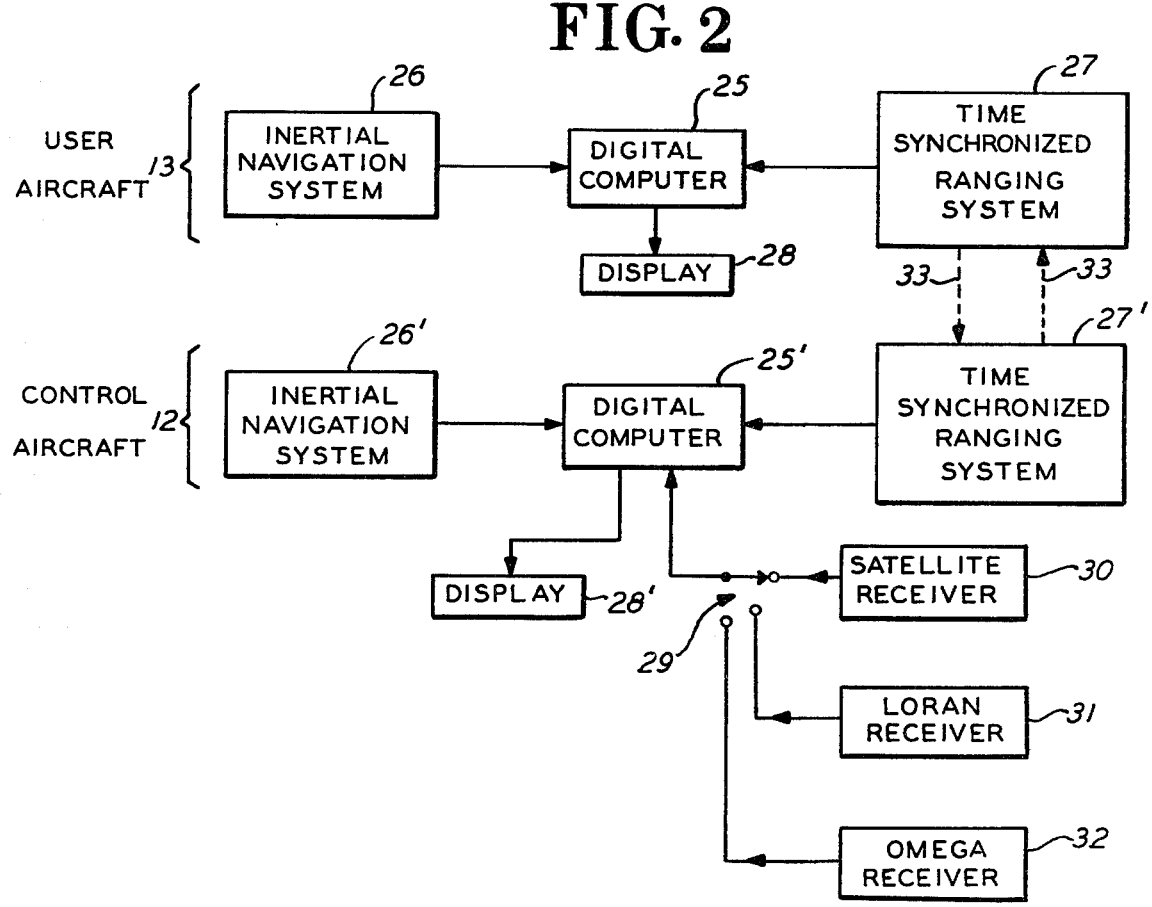
FIG. 2 is a block diagram showing the navigation and communication system of the invention installed in both a control aircraft and a user aircraft and illustrating the data links between the aircraft and the data links between the aircraft and external data sources.

Referring now to FIG. 2 of the drawings, there is shown the basic apparatus comprising the tactical navigation and communication system of the present invention. The basic equipment for the control aircraft 12 and each of the user aircraft 13 is shown together with the data links between control and user aircraft and the data links between the control aircraft and external georeferenced data sources. Each of the user aircraft 13 is provided with a digital computer 25 which receives certain navigational information from an inertial navigation system 26 and a time synchronized ranging system 27. The output from the computer 25 is fed to a user display panel 28. The basic equipment in the control aircraft 12 consists of a digital computer 25', an inertial navigational system 26', a time synchronized ranging system 27' and a display panel 28' which are substantially the same as the correspondingly numbered units in the user aircraft 13. The control aircraft 12, however, is also provided with means for receiving externally-supplied, georeferenced information. As illustrated, the digital computer 25' of the control aircraft is connected by a switch 29 to one of three sources of georeferenced navigational information. The three sources illustrated are a satellite receiver 30, a Loran receiver 31, and an Omega receiver 32. The satellite receiver 30 functions to receive radio signals from satellite navigation systems, such as the system 19 shown in FIG. 1 of the drawings, and provides a source of highly-accurate, latitude and longitude positional information. Although this navigational information does not have the short term accuracy provided by an inertial navigation system, for example, the information supplied has excellent long term stability and will permit navigation of an aircraft over virtually the entire globe. The Loran receiver 31 is a hyperbolic system which receives radio transmissions from two pairs of spaced ground stations. By computing the time delay of the received signals from each pair of ground stations, it is possible to locate the position of the aircraft with respect to the ground stations. The Omega receiver 32 receives radio transmissions from an Omega navigation system which is somewhat similar to the Loran system, except that the Omega system is capable of a much wider range of operation and operates by comparing the phase difference of the received signals from the ground stations. Both the Loran and Omega systems are similar to the satellite system in that they will provide stable, long term georeferenced positional information. The Loran and Omega information, however, is generally of a lower order of accuracy than the information available from the inertial navigation system.

In the navigation and communication system of the invention, the control aircraft 12 is provided with a source of long term accurate georeferenced positional information from one of the receivers 30, 31 and 32. This information is applied to the digital computer 25′ of the control aircraft. The short term accurate positional information derived from the inertial navigation system 26′ is also applied to the computer 25′, so that the control aircraft is able to navigate with information supplied from both types of navigation sources. By means of Kalman filter techniques, the information from the inertial system and the information from the external georeferenced systems are combined in the computer 25′ to provide extremely accurate resultant navigational information for the control aircraft 12. This resultant information is transmitted to each user aircraft by the radio links 33 which exist between the time synchronized ranging systems of each aircraft in the community.

Basically, the control aircraft 12 establishes a relative grid coordinate system, such as shown in FIG. 1 of the drawings, which may have its origin referenced to a precise geographic location. The geographic location of the grid origin may be determined by a knowledge of the latitude and longitude of known points on the earth's surface, by information received from the georeferenced sources 30-32, or by reference to a radio beacon station or stations at known geographic locations. By means of the information transmitted by the time synchronized ranging system of the control aircraft, each of the user aircraft is enabled to determine its position in the relative grid coordinate system to a high degree of positional accuracy. The inertial navigation system 26 of each of the user aircraft provides extremely accurate short term velocity and positional information to the computer 25 of the user aircraft since it is able to follow the high frequency motional dynamics of the user aircraft in the tactical area defined by the relative grid system. The time synchronized ranging system 27 of each user aircraft is able to interrogate the control aircraft 12 at periodic time intervals and through a time delay measuring technique can determine its location with respect to the control aircraft. This, in effect, establishes the position of the user aircraft in the relative grid coordinate system and permits the navigational information in the digital computer 25 from the inertial measuring system to be periodically "updated".

As will be more fully explained hereinafter, the data transmission from the time synchronized ranging system of the control aircraft also contains information relating to the geographic coordinate location of the relative grid origin, so that each user aircraft is able to know its position both in the geographic coordinate system and in the relative grid system established for the tactical area. This arrangement permits each of the aircraft in the tactical community to operate simultaneously in two or more coordinate systems. Although the control aircraft 12 has been shown in FIG. 2 of the drawings as receiving the externally-supplied georeferenced information from the receivers 30-32, it will be understood that for some types of tactical navigation missions, the time synchronized ranging system of the control aircraft may itself be used to furnish the georeferenced positional information. For example, when the ranging system 27′ of the control aircraft is used in conjunction with ranging systems at known ground stations, the control aircraft 12 and, consequently, each of the user aircraft 13 are enabled to establish their position with respect to the ground stations.

Figure 3:
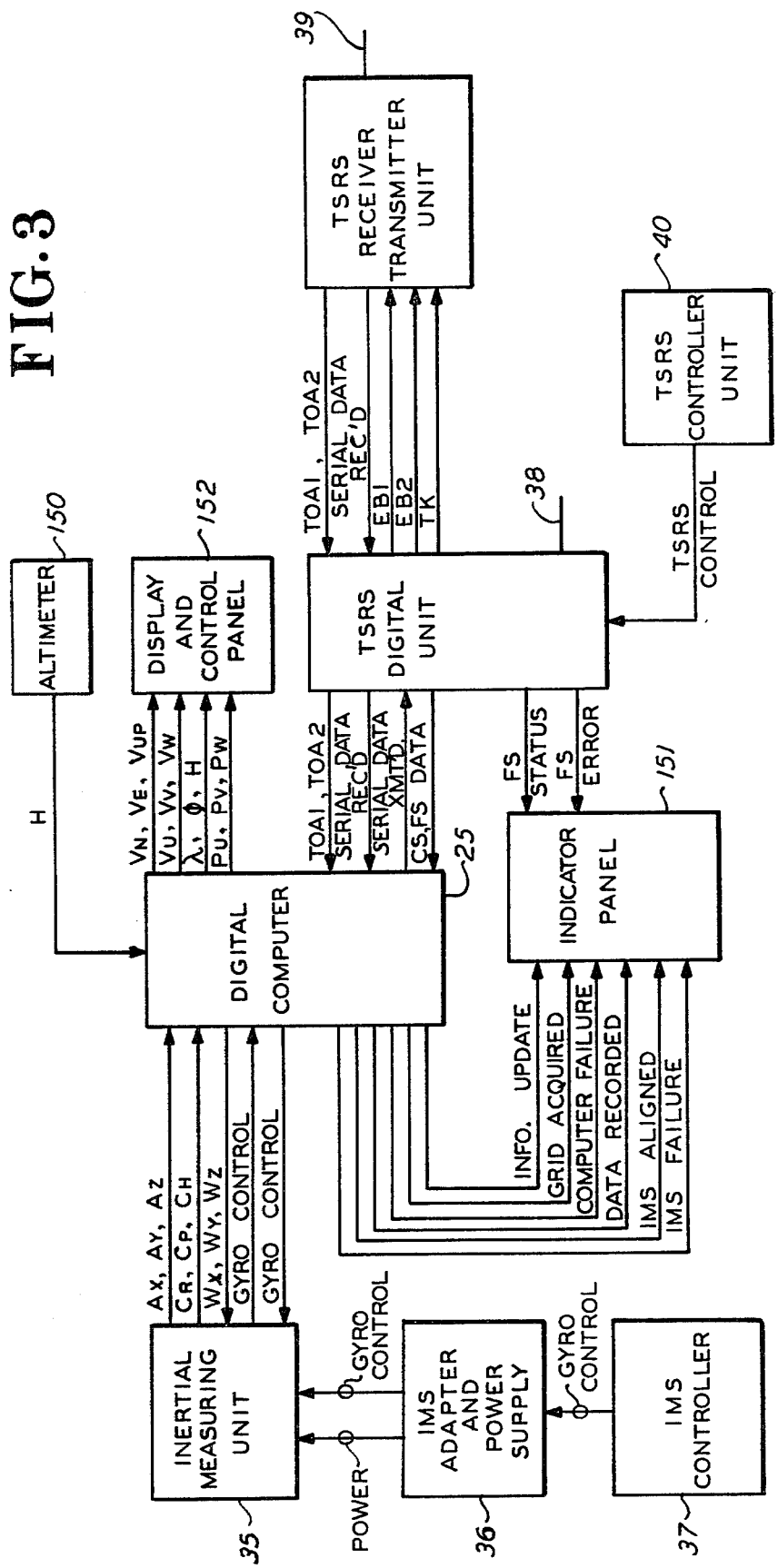
FIG. 3 is a block diagram of the navigation and communication system of the invention showing the basic units of the system which are common to both control aircraft and user aircraft.

Referring now to FIG. 3 of the drawings, there is shown a block diagram of the portion of the navigation and communication system of the invention which is common to both the control aircraft and each of the user aircraft. As seen in FIG. 3, the inertial navigation system 26 comprises an inertial measuring unit 35, an adapter and power supply unit 36, and a controller 37. The three units of the inertial system may conveniently comprise U.S. Department of Defense Type AN/ASN-90, which is a commercially available unit. The inertial measuring unit 35 comprises a platform which is stabilized in space by a vertical gyroscope. A second gyroscope is provided on the stable platform to sense changes in the heading or azimuth. The stable platform provides a set of three, mutually-perpendicular axes, X, Y and Z, which are referred to as the inertial reference axes. Since the platform remains stable in space, the attitude of the aircraft in which the unit is mounted may be easily determined to provide indications of the roll, pitch and heading of the aircraft. The inertial measuring unit also includes three accelerometers which sense the acceleration of the aircraft along the X, Y and Z inertial axes. The accelerations along the three inertial axes are designated as $A_X$, $A_Y$ and $A_Z$ and are shown in FIG. 3 as being supplied to the digital computer 25 by the inertial measuring unit 35. The aircraft roll, pitch and heading are designated as $C_R$, $C_P$ and $C_H$, respectively, and are also shown as being supplied by the inertial measuring unit to the digital computer 25.

Gyroscope torquing signals, designated as $W_X$, $W_Y$ and $W_Z$ are shown in FIG. 3 as being supplied by the computer 25 to the inertial measuring unit. These signals are generated by the digital computer from the output data supplied by the inertial measuring unit and are employed to align the stable platform so that the Z axis is vertical and coincides with a radial line from the center of the earth. The vertical gyro is precessed by the application of the $W_X$ and $W_Y$ torquing signals, while the azimuth of the platform is established by precessing the horizontal gyro with the $W_Z$ signal. The IMS adapter and power supply 36 functions to supply power for the gyroscope motors and electronic circuitry and also provides signals for various gyroscope control functions, such as ground alignment, gyro start-up and gyro caging. The IMS controller 37 permits the pilot of the aircraft to initiate the gyro control signals and operations. The basic functions and operation of an inertial navigation system are described in U.S. Pat. No. 3,260,485, issued to H. Lerman et al on July 12, 1966, and will not be described further herein.

Preferably, the $A_X$, $A_Y$ and $A_Z$ acceleration signals and the $C_R$, $C_P$ and $C_H$ attitude signals are supplied in digital form to the computer 25 by utilizing analog to digital conversion techniques which are well known in the art. The acceleration signals may be integrated to obtain aircraft velocity along the X, Y and Z inertial axes, so that the computer 25 knows the velocity of the aircraft at any instant of time and is therefore able to calculate the position of the aircraft at any given instant of time. When the initial coordinates of the aircraft position are stored in the computer before the aircraft starts its flight, the computer computes the subsequent positions of the aircraft by a "dead reckoning" technique, so that the latitude, longitude and altitude of the aircraft are determined by the inertially-generated navigation signals. A suitable method of computing latitude and longitude in a digital navigation system is described in U.S. Pat. No. 3,250,899, issued to E. J. Smith on May 10, 1966, and will not be described further herein. Since the inertial navigation signals depend upon the accurate alignment of the stable platform, it is believed apparent that the information supplied will tend to "degrade" or become inaccurate over long periods of time because of gyro "drift" and other factors. For short term operation, however, these signals provide very accurate information as to the aircraft velocity, attitude and position.

The time synchronized ranging system (TSRS) portion of the navigation system of the invention is shown in FIG. 3 of the drawings as comprising a digital unit 38, a receiver-transmitter unit 39, and a controller unit 40. The TSRS performs several basic functions. The first function is to provide distance or range measurements between TSRS-equipped users in the tactical community. The second function of the TSRS is to provide a communication link for the transmission of data between system users. The communication link may also include provision for identification of system users, such as the IFF (identification friend or foe) function in military applications. Since the TSRS is called upon to handle and transmit digital information, a biphase modulation technique is conveniently employed to modulate the radio waves. The biphase modulation technique employed requires relatively low peak power and is relatively amplitude insensitive. Additionally, this method of modulation permits of differential phase decoding which is asynchronous in operation. Finally, the modulation system employed has a low probability of error in the transmitted digital information. For example, with a receiver signal-to-noise ratio of 11 db, a bit error rate of less than 10 parts per million may be expected. Barker encoding is employed in the transmitted radio waves to initiate all timing intervals and identify the particular transmission. The Barker code is employed for the timing function and identification of transmission because it provides an extremely low noise level at all times except at the time of the defined event. The Barker code consists essentially of a sequentially-transmitted train of 13 bits. Since the transmitted signal is biphase modulated, each bit is defined as the presence or absence of a phase shift. When the received Barker sequence is decoded, the receiver sums the amplitude of the pulse train over the interval of the train. The resulting output pulse has its amplitude multiplied by the number of bits in the Barker code. Accordingly, the timing pulse which initiates the event has an amplitude gain of 13 when a 13 bit Barker code is employed.

Figure 4:
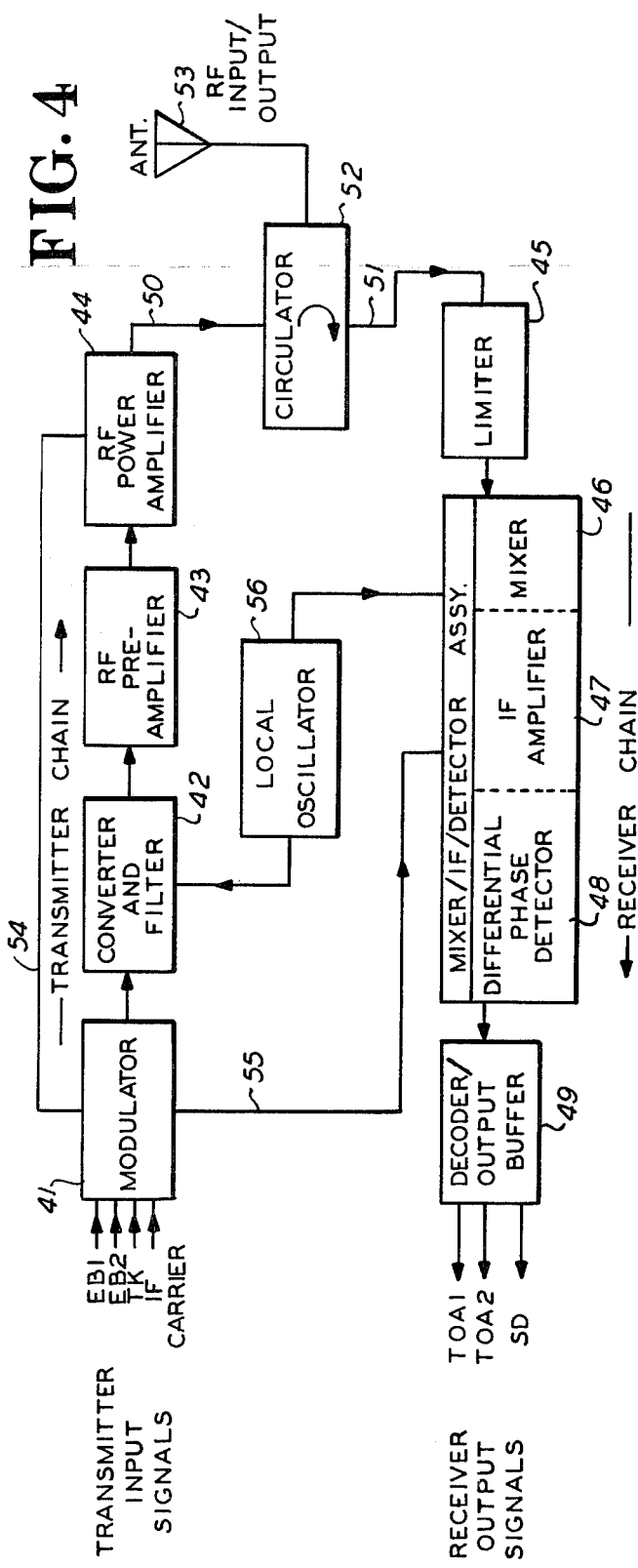
FIG. 4 is a block diagram of the receiver-transmitter unit of the time synchronized ranging system portion of the navigation system of the invention.

The TSRS receiver-transmitter unit 39 is shown in FIG. 4 of the drawings as having a transmitter section comprising modulator 41, converter and filter 42, RF preamplifier 43, and RF power amplifier 44. The receiver section of the receiver-transmitter unit comprises limiter 45, mixer 46, IF amplifier 47, differential phase detector 48, and a decoder-output buffer combination 49. The output 50 of the transmitter section and the input 51 to the receiver section are both connected to a circulator 52 which has its output coupled to a transmitting-receiving antenna 53. The circulator 52 may comprise a mechanical or electronic switching arrangement which permits the antenna 53 to be connected to either the transmitter section or the receiver section at any given time, so that a single antenna may be employed to perform both the transmitting and receiving functions. In order to provide for a satisfactory 100 mile operating range, the transmitter may have 750 Watts of peak power at a carrier frequency of 1140 MHz.

The basic function of the receiver-transmitter unit in the aircraft is to transmit data from the TSRS digital unit 38 in that aircraft and to receive data transmitted by the receiver-transmitter unit of a cooperating aircraft. In the transmitter section of the receiver-transmitter unit, the modulator 41 receives four inputs from the TSRS digital unit 38. One of the inputs is a 60 MHz IF carrier which is derived from a master oscillator located in the TSRS digital unit 38. The modulator also receives differentially encoded data signals EB1 and EB2 from the digital unit. When a logical "1" is applied to the EB1 line, the IF carrier is allowed to pass with no phase shift. When EB2 becomes a logical "1", the phase of the 60 MHz carrier is shifted by 180°. When both EB1 and EB2 are in the logical "0" state, no carrier signal is allowed to pass. With the particular logic employed in the disclosed embodiment of the invention, EB1 and EB2 will never be at a logical "1" state at the same time. By virtue of this arrangement, the EB1 and EB2 logic signals serve to biphase modulate the 60 MHz carrier signal applied to the modulator. The fourth signal applied to the modulator 41 is a TK signal which functions to switch the entire receiver-transmitter unit from the normal receive mode of operation to the transmit mode. The modulator 41 also produces an output signal 54 which serves to bias the RF power amplifier 44 into its operating region. The TK transmit signal causes the modulator 41 to produce an output signal 55 which shuts off the IF amplifier 47 of the receiver, since the receiver section will not be required to operate when the unit is in the transmitting mode. The biphase modulated output signal from the modulator 41 is then applied to the converter and filter 42 where it is mixed with a local oscillator signal derived from a local oscillator 56. The resulting "beating" of the signals in the converter 42 produces two biphase modulated RF output signals. One of the RF output signals will be at a frequency equal to the local oscillator frequency plus 60, while the other output signal will be at a frequency equal to the local oscillator frequency minus 60. The filter section of the converter and filter assembly 42 serves to select which of these two RF output signals is to be applied to the RF preamplifier. The RF preamplifier 43 and the RF power amplifier 44 serve to amplify the selected RF output signal to approximately 250 Watt peak strength. This signal is then radiated by antenna 53 to the aircraft and other users in the community.

In the receiver section of the receiver-transmitter unit, the received signal from antenna 53 is applied through the circulator 52 to a limiter 45 which functions to limit or clip the received RF signals to a power level of approximately 50 Milliwatts. The limiter 45 serves as a safety device to prevent the high power level transmitted signals from the transmitter section of the unit from reaching the mixer 46 in the event that a malfunction occurs in the circulator 52, thereby preventing damage to the receiver section. The RF signal received from the antenna is mixed in mixer 46 with a signal from the local oscillator 56 to provide a 60 MHz IF signal which is then amplified in the IF amplifier section 47 to a level suitable for detection. The signal applied to the differential phase detector 48 is then a 60 MHz biphase modulated signal having a fixed amplitude. Since the received signal consists of a sequentially transmitted train of bits, the differential phase detector 48 compares the phase of each received bit with the phase of the preceeding bit. If a phase reversal has occured, a negative-going output pulse is produced. If no phase reversal has occured, a positive-going output pulse is produced. The output from the differential phase detector is therefore a bipolar pulse train. The decoder/output buffer 49 includes logic circuitry which will respond to two specific 13 bit Barker codes. A normal Barker code will produce a pulse or logical "1" at the TOA1 output, while an inverted Barker code will produce a pulse or logical "1" at the TOA2 output. As previously mentioned, these specific Barker codes provide the means for initiating the timing functions of the TSRS system and identifying the transmissions. In practice, the decoder 49 may, for example, comprise known digital comparator circuits which compare a known digital signal with an unknown signal on a bit-by-bit basis to produce an output when there is complete identity of digital information. Since the received TSRS signal contains not only Barker code timing points but also certain transmitted serial data, the decoder network 49 is designed to produce the serial data as an output separate and apart from the TOA1 and TOA2 output signals. This may be easily accomplished by the use of known digital filter techniques.

Figure 5A:
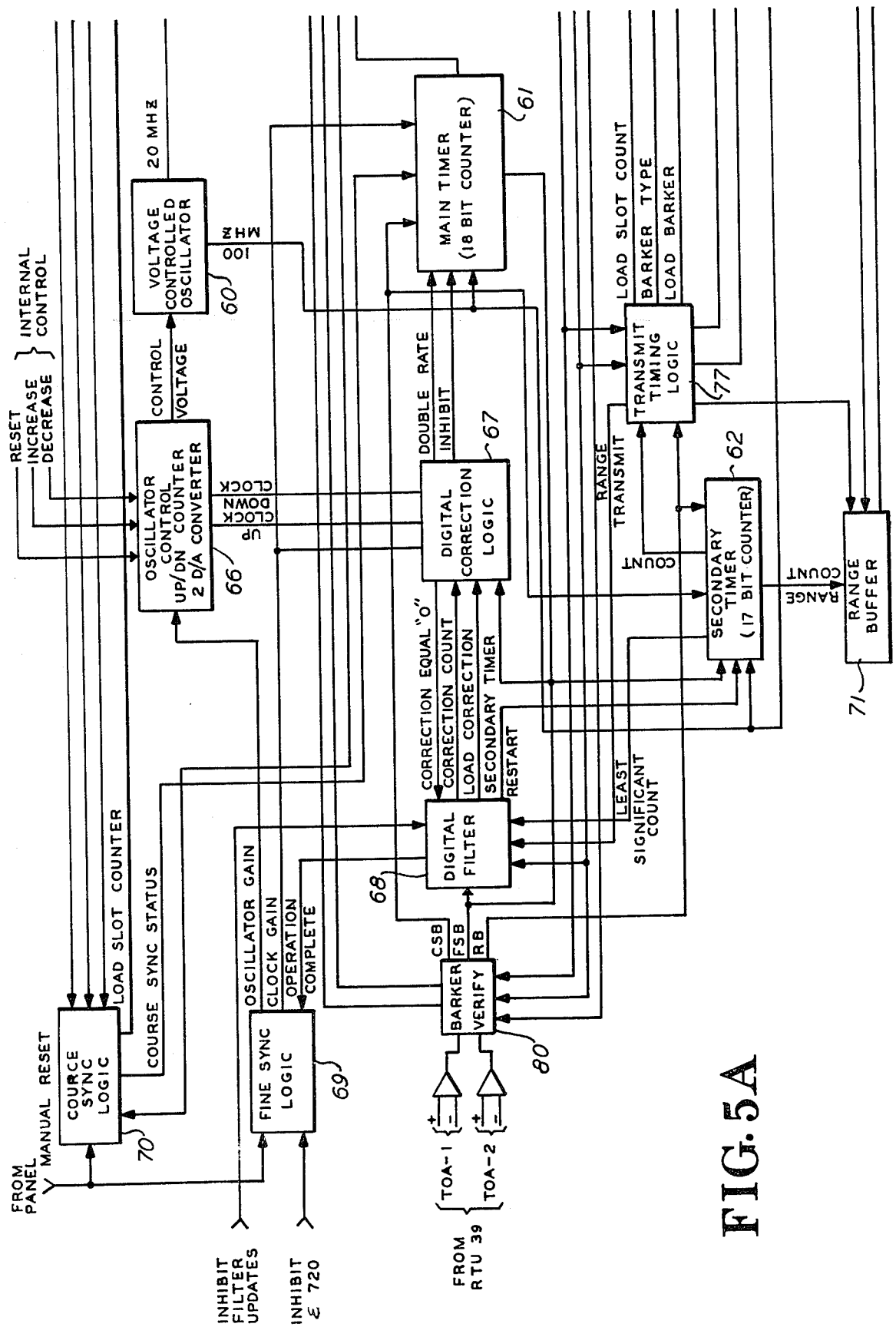
FIG. 5 is a functional block diagram of the digital unit of the time synchronized ranging system portion of the navigation system of the invention.
Figure 5B:
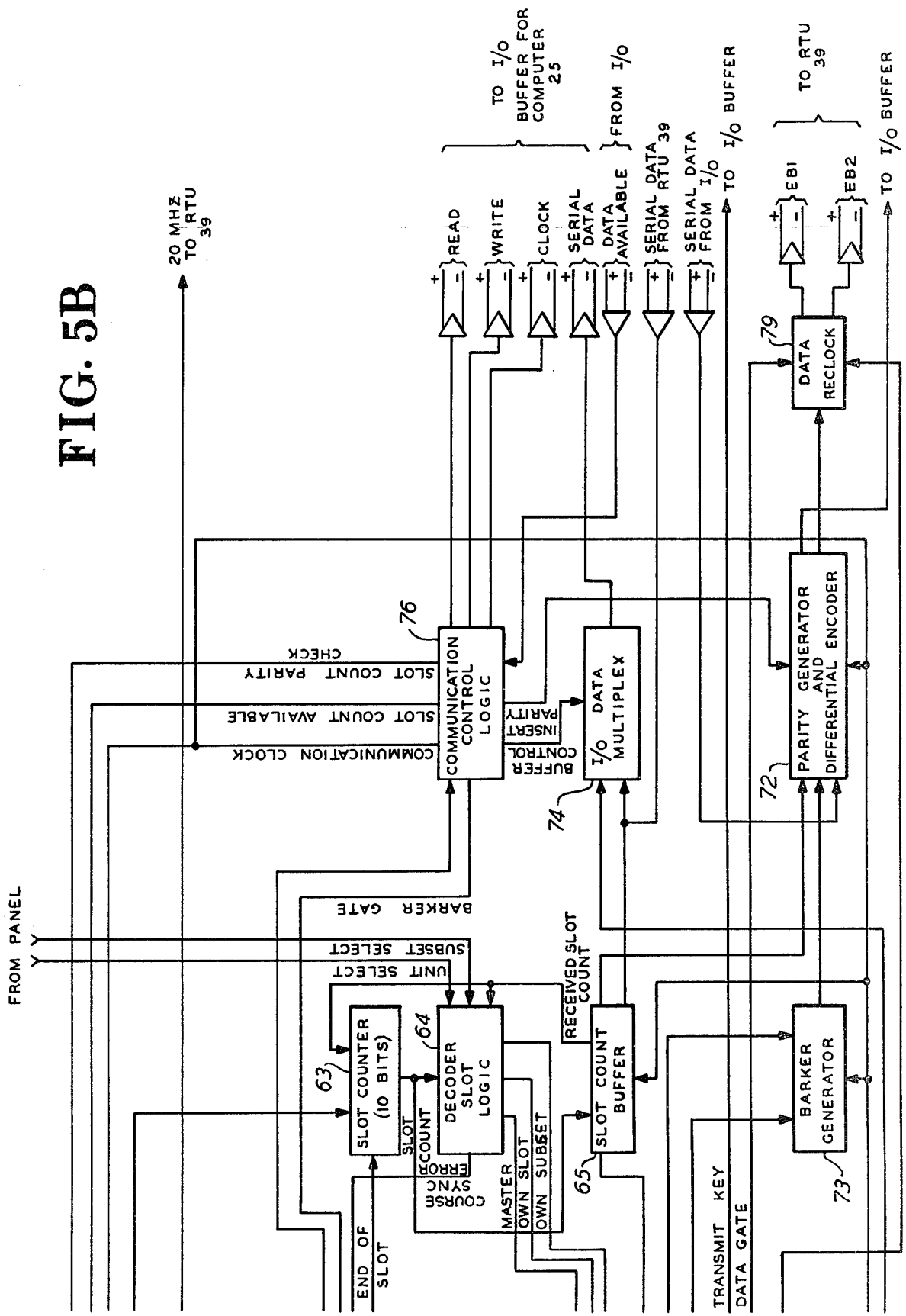

A functional block diagram of the TSRS digital unit 38 is shown in FIG. 5 of the drawings. Basic timing for the TSRS is derived from the cycle length of an 18 bit binary counter main timer 61 which operates from a 100 MHz frequency source 60. All of the critical timing functions of the system are synchronously clocked, with less critical functions clocked by ripple generated clocks within the main timer. A secondary timer 62 provides a means for time measurement and for control of all RF transmissions. The secondary timer, which may comprise a 17 bit counter, also operates from the 100 MHz frequency source and is periodically synchronized to the main timer in order to provide the basis for its ancillary timing functions. The secondary timer can be stopped by the application of an appropriate TOA pulse from the receiver-transmitter unit 39, so that the contents of the secondary timer provide a measure of range or synchronous error between the TSRS systems of the control aircraft and a user aircraft. A slot counter 63, which may be a 10 bit binary counter, is provided to determine the system cycle time. The cycle length of this counter determines the system cycle time. The slot counter is advanced by carries from the main timer 61 and the contents of the slot counter uniquely determine each slot of the 1024 slots in the entire system cycle. Initialization of the contents of the slot counter 63 takes place during the coarse sync mode of operation during acquisition of the relative grid. The 100 MHz frequency source 60 is a voltage-controlled oscillator which is part of a time/frequency/phase control loop. As will be seen later, frequency correction pulses proportional to the sync error between system clocks of the control and user aircraft correct an up/down counter which is part of a functional block 66. The output of the up/down counter controls the oscillator 60 through a digital to analog converter which is also part of block 66. Phase control pulses modify the frequency control for a fixed duration. Time correction control is applied directly to the main timer from a loop within the main timer itself. The voltage-controlled oscillator 60 also provides a 20 MHz output which is stepped up in frequency by means (not shown) to become the 60 MHz IF carrier for the TSRS receiver-transmitter unit 39. Corrections for sync error are based on the output of a simple, digital Kalman filter 67, 68. The filter algorithm employed is a piecewise linear approximation to a linear filter with time varying gain. Given a measured sync error from the secondary timer 62, the filter generates correction signals for the main timer 61 and the voltage-controlled oscillator 60. The filter is active only in the user aircraft, since the controller's time base or main timer output is accepted as the reference for the community of aircraft.

The main timer 61 is essentially a high frequency counter which is capable of accepting the 100 MHz basic clock from the controlled oscillator 60. The counter has a high speed section and a low speed section; the latter section being for stages which run at a clock rate less than 3 MHz. The high speed stages may comprise emitter-coupled, logic elements, while the low speed stages may comprise conventional TTL logic elements. The main counter 61 is preset in accordance with corrections determined by the synchronization function built into the digital unit 38. For proper operation of the navigation system of the invention, it is essential that the master timers of all control and user aircraft in the community operate in synchronism. To this end, corrections are made to the main timer in each user aircraft in accordance with signals received from the TSRS of the control aircraft whose main timer operation is arbitrarily used as the overall system clock.

The secondary timer 62 also runs at the basic 100 MHz input clock rate and has a basic counter design similar to the main timer. Among the functions it performs is the function of making range measurements to any system member. The system operation is such that each individual user is assigned a particular "slot" in the system cycle during which the user transmits a combination ranging-fine sync request signal at the beginning of his slot. The ranging-fine sync request signal is a 13 bit Barker code. All other members of the tactical community receive the ranging Barker code transmitted and make a range measurement to that particular user when they individually receive the ranging Barker. The secondary timer of the user receiving the signal is stopped when the ranging Barker is detected in a Barker verify section 80 of the digital unit 38. The count accumulated in the secondary timer at that time is directly proportional to the range between the receiving user and the sending user. The count accumulated is then transferred to the digital computer 25 through a range buffer 71, an I/O data multiplex unit 74, and an I/O buffer or "interface" (not shown). The secondary timer 62 is also used to generate control gates and pulses for transmitting signals from the TSRS equipment. The communication control logic block 76 and a transmit timing logic block 77 cooperate with the secondary timer in performing these functions. During each system user's own time slot, the ranging-fine sync request Barker signal previously discussed must be transmitted precisely during a particular number of bit times, which may be, for example, 27 bit times, at the beginning of the slot. The secondary timer starts the generation of this signal and ends it at the correct time. It also turns on the transmitter by issuing the transmit key signal TK one bit time ahead of the start of the generation of the ranging Barker signal. The secondary timer 62 also controls the generation of serial data to be transmitted after the ranging Barker has been transmitted. The radio transmission from the transmitter of the receiver-transmitter unit 39 is shut off and the receiver portion of that unit activated when the transmit key signal is removed after all data has been transmitted.

The secondary timer performs an additional control function when the TSRS is located in the control aircraft. In this case, the beginning of the transmitted message in the control aircraft's time slot is a coarse sync Barker followed by a slot count and certain serial data. The makeup of this message is controlled by the secondary timer which turns the transmitter on and off by means of the TK signal. In each case, the control gates and timing signals which are necessary for the formulation of the entire message are also generated by the secondary timer and transmitted internally to and from the computer 25. These signals will be hereinafter discussed during the description of the communications function of the digital unit 38.

The time base or entire operating cycle of the TSRS is divided into slots which are assigned to each of the cooperating members of the tactical community. The slot counter 63 is the basic control for the slot identification function during the course of a complete cycle of operation. When the slot counter is a 10 bit counter, 1024 individual slots may be generated during an entire cycle of operation. To produce this operation, the slot counter is driven by the output of the main timer 61 and is pulsed approximately every 2.6 Ms. Total cycle time is therefore 1024 multiplied by 2.6 Ms, or approximately 2.69 seconds. The operating cycle is further broken down into 16 subsets of 64 slots each. During the entire operating cycle, 64 slots are utilized or assigned to different members of the tactical community. The control aircraft is assigned one of the 64 slots and the remaining 63 slots are assigned to user aircraft. Each user aircraft is assigned to a unique time slot, so that every system member has its own time slot. With a complete system cycle of 1024 slots, the timing is arranged so that each of the 64 slots assigned to the system members are separated by a "relay slot" of 16 basic slots in duration. These relay slots will be described in detail hereinafter. The output of the slot counter 63 drives a slot count decoder logic block 64 which functions with operating control signals generated by the computer 25 to determine a system members own time slot and the time slots for the other members of the community. When a coarse sync Barker code is transmitted by the control aircraft and a user aircraft, the slot count contained in the transmitted message is compared to the slot count as determined by the user's own slot counter 63. If these two numbers do not agree, the user's slot counter 63 is reset to the slot count transmitted in the controller's coarse sync message. A slot count buffer 65 holds the received slot count when the comparison is made.

The 100 MHz frequency source 60 is a voltage-controlled crystal oscillator and is housed within a proportional controlled oven to prevent frequency drift caused by ambient temperature variations. Preferably, the oscillator has a manual setting capability of ±50 cycles and a maximum drift rate of 1 cycle/second per day. The oscillator is the crucial component generating the time base of each cooperating member of the tactical community. Control of the oscillator is therefore necessary to synchronize the time bases of all system members and is accomplished by both frequency and phase control techniques.

The frequency control of the oscillator is a direct result of the basic synchronization method used in the TSRS equipment. This synchronization method requires each user aircraft to transmit a fine sync request Barker encoded signal at the beginning of the user's own assigned time slot as determined by the user's own time base. This fine sync request signal also functions as the ranging Barker signal which was previously discussed and is generated by the Barker generator 73 of the user aircraft. The control aircraft receives this signal and determines the time delay from the start of the slot during which this signal was received in accordance with the controller's time base. The time delay measuring function is performed by the secondary timer of the control aircraft. The control aircraft then transmits a Barker encoded fine sync reply signal at a point in time which precedes the end of the slot by an amount equal to the time delay of the received fine sync request signal. If the user's and controller's time bases are exactly synchronized, the fine sync reply signal will reach the user aircraft exactly at the end of the user's time slot. Any difference between the actual time the signal is received and the indicated end of the user's time slot represents the difference between the user's time base and the controller's time base. The user then makes a correction to its main timer 61 and also corrects the frequency of its oscillator 60 in order to realign the user's time base to the controller's time base.

The correction in frequency to the oscillator 60 is made by means of an up/down counter and a digital to analog converter functionally represented as block 66. The digital output of the up/down counter is converted to direct current and applied to the voltage control input of the crystal oscillator. The digital filter 68 and digital correction logic 67 cooperate to produce a fraction of the synchronization error signal which is added to or subtracted from the up/down counter 66. The fraction of the error signal which is added or subtracted is directly proportional to the magnitude of the error signal. When the user's and controller's time bases are close to synchronization, the frequency correction is made at a relatively low gain, such as 1/256 of synchronization error, for example. When the systems are far from synchronization, the frequency correction is made at a higher gain, such as ¼ of synchronization error, for example.

Phase corrections to the oscillator 60 are also made in accordance with the fractional error signal derived from the fine sync synchronization error. The phase corrections are made by adding a number of counts into the up/down counter 66 which changes the frequency of the oscillator for the time that these extra counts are in the counter. The counts are then removed from the up/down counter before the end of the system cycle. This total action effectively changes the phase of the oscillator frequency without affecting the frequency itself.

The variations in gain for frequency correction by the up/down counter 66 are obtained by entering the up/down counter at different stages to produce an output having a lesser or greater correction effect. The digital correction logic block 67 completes the total correction done every cycle. As mentioned previously, this correction is made in the main timer 61. The full synchronization error is used as the correction to the main timer. The corrections to the oscillator 60 and main timer 61 are made in accordance with the output of variable-gain digital filter 68. The variations in the gain are controlled by a basic phase diagram. The phase control diagram, in turn, is controlled by the sync error measured. Another phase control diagram works in conjunction with the correction control phase diagram and controls initialization and gross error correction. Initially, this latter control diagram sets each member of the community in coarse synchronization by causing the control aircraft to transmit a coarse sync, Barker-encoded signal at the beginning of the control aircraft's own time slot. Every user aircraft in the community receives this signal and resets its slot counter 63 to zero at this time. Once the coarse synchronization is firmly established, the other phase control diagram known as the fine sync control takes over. Prescribed steps are taken to get the synchronization error down to a minimum. Initially, the previously described high gain corrections ($\frac{1}{4}$ of error) are used to correct the oscillator, but after the first few cycles of operation, the fine sync control diagram automatically changes to the low gain configuration. The low gain (1/256 of error) is maintained until synchronization errors reach close to zero with a small tolerance. During this entire time, the correction gain control for the main timer 61 has been maintained at unity gain (full error) so that all indicated errors are immediately corrected at each cycle time. Once every complete system cycle, each user aircraft in the community sends the fine sync request signal to the control aircraft in the user's own time slot and receives the fine sync reply signal from the controller, so that synchronization is maintained throughout the entire cycle.

In FIG. 5 of the drawings, block 69 represents the fine sync Barker logic detection circuitry and block 70 represents the coarse sync Barker logic detection circuitry. These logic circuits in the user aircraft decode the particular Barker signals expected. The fine sync logic 69 will not allow a fine sync reply Barker signal to be received in any time slot except the user's own time slot. Similarly, the fine sync request signal is only transmitted by a user aircraft during the user aircraft's own time slot. The coarse sync Barker signal may be received at all times, however, since this signal does the basic time base synchronization and a user aircraft joining the community must be able to coarse synchronize immediately.

The last major section of the TSRS digital unit 38 is the communication control logic 76. All message control, as well as the Barker signals are handled in this section. Measured range information by each member of the community is transferred through this section to the digital computer 25 through the I/O buffer (not shown). As shown in FIG. 5, these TOA1 and TOA2 signals are applied directly to the communication control logic 76 from the Barker verify circuit 80. The range data buffer register is shown in block 71 and accepts the measured range information accumulated in the secondary timer 62. When the range data is sent to the I/O buffer it is tacked on to the end of a data burst (serial data) accepted via the data link in the system.

The actual communication message takes two forms depending on whether the system member is a controller or a user. For a controller, the serial data message is sent immediately after the transmission of the coarse sync Barker signal and includes a slot count followed by a prescribed number of bits of information. The number of bits of information may, for example, be 144 bits. Parity bits are included in the 144 bits and are inserted, for example, as every ninth bit. For a user aircraft, the serial data message is sent immediately after the transmission of the fine sync request-ranging Barker signal and includes only the bits of information, without a slot count.

Each member of the community receives every transmitted message and makes appropriate parity checks as the message is received. The received message is immediately transferred to the I/O buffer. However, should a parity error show up in the message a parity error flag is sent to the computer 25 through the I/O buffer. The parity generator and parity checker is shown in block 72. All serial data transmitted and received is completely flexible and under computer program control. The I/O buffer is used to store the message which is outputted from the computer. The control circuitry within the digital unit 38 controls the transmission of the serial data from the I/O buffer through the digital unit and on out to the TSRS receiver-transmitter unit 39 where it is transmitted. There is no data storage of any kind in the digital unit. All serial data is immediately transmitted on the fly between the I/O buffer and the receiver-transmitter unit 39. The parity generator 72 inserts parity bits as the serial data message is passed through the digital unit. The control of the digital unit 38 during reception of serial data is similar to the control exercised during transmission. The receiver control is initiated by the reception of the appropriate Barker-encoded signal and ends the prescribed number of bits later. The measured range information is transferred over to the I/O buffer at the end of the received serial data message.

For transmission of a message, the Barker generator 73 is used to generate the appropriate Barker code signal. As explained previously, the Barker code transmitted depends upon whether the unit is a controller or user. The control aircraft unit generates a coarse sync Barker signal in its own time slot and a fine sync reply Barker signal in each user aircraft's time slot. The user aircraft generates a combination ranging-fine sync request Barker only at the beginning of its own time slot. The transmitted Barker signal must be multiplexed together with the rest of the serial data from the I/O buffer to make up the entire transmitted message. The multiplexing is done in data multiplex block 74 and is controlled by a transmit timing control logic circuit 77. During a fine sync request-ranging Barker transmission, the Barker code transmitted is immediately followed by the serial data from the I/O buffer. During a coarse sync Barker transmission, the slot count being held in the slot count buffer block 65 follows the coarse sync Barker signal. The serial data, in turn, follows the slot count. The communication control logic 76, which is basically controlled by the secondary timer 62 and is started during reception of the message by the received Barker signals, generates the various timing gates necessary to handle the received messages. During the entire transmission time, a transmit turn on signal TK is generated by transmit timing logic block 77 to turn on the transmitter in TSRS unit 39 during transmission time only. The transmitter is immediately turned off after transmission. The receiver section of TSRS unit 39 is turned off during transmission time by the same TK signal and is immediately turned on after completion of the transmission.

Figure 6:
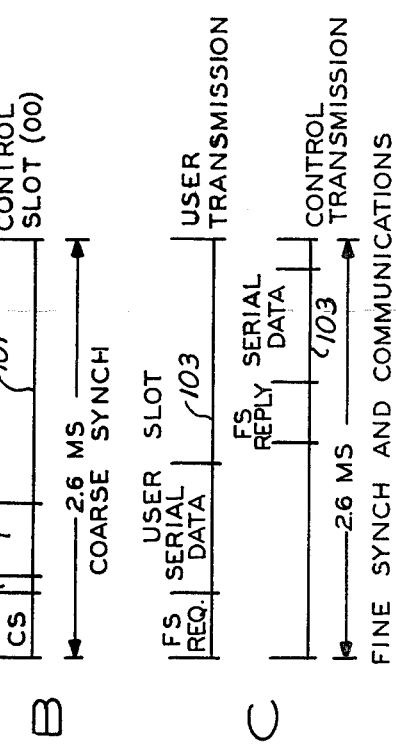
FIG. 6 is a diagram illustrating the timing and synchronizing functions of the time synchronized ranging system shown in FIGS. 2-5 of the drawings.
Figure 6:
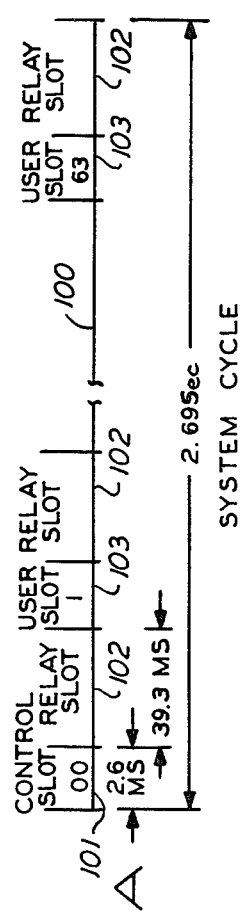

The TSRS timing and cycle format is shown in FIG. 6 of the drawings. The complete system cycle is shown in section A of FIG. 6 and consists of 1024 basic time periods or slots. The total length of an entire system cycle 100 may, for example, be 2.69 seconds. Each complete system cycle is initiated by a control slot 101 which is assigned to the control aircraft and is designated "Control Slot 00". The Control Slot may have a time duration of 2.6 Ms. This slot is one of 64 "member slots" of equal time duration which are generated during each system cycle. The Control Slot 101, however, is used by the control aircraft for the transmission of the coarse sync Barker encoded signal which may be used for both coarse synchronization and range measuring purposes. The Control Slot 00 is shown in section B of FIG. 6 where the coarse sync Barker signal is shown as being transmitted at the start of the slot. The coarse sync signal, as explained previously, is followed by a slot count and transmitted serial data from the computer 25 of the control aircraft. The 64 member slots in the complete system cycle are separated from each other by a relay slot 102 of approximately 39.3 Ms. The 63 remaining member slots have the same time duration as the Control Slot 101, namely, 2.6 Ms, and are assigned to the user aircraft in the community. The user slots are designated 103. Each user slot is assigned to a different user aircraft, so that each aircraft in the community, both control and user, is assigned a uniquely different time slot.

As seen in section C of FIG. 6, each user aircraft transmits its fine sync request signal at the beginning of its own time slot and immediately follows that transmission with the transmission of serial data from its computer 25. The control aircraft uses the other half of each user slot 103 for the transmission of the fine sync reply signal. Again, the fine sync reply signal is followed by the transmission of serial data from the computer of the control aircraft to the particular user aircraft involved. As explained previously, the transmission of the coarse sync, fine sync request and fine sync reply signals are each identified by a different Barker code employed in the system. When the clocks of all system members are synchronized, the control aircraft can measure the time delay involved in receiving the fine sync request signal from a particular user aircraft and can therefore determine the distance or range to that user aircraft. Similarly, a user aircraft can measure the time delay involved in receiving the coarse sync signal transmitted by the control aircraft and can therefore determine the range to the control aircraft. Accordingly, the coarse sync and fine sync request signals also serve as ranging signals. The serial data transmitted may include georeferenced positional coordinates, relative grid coordinates, altitude, velocity and certain other data as will be hereinafter described.

The relay slots 102 may perform the dual functions of providing time separation between the various control and user slots and providing unique time periods for the relaying or transmission of data and other messages between the community members. Accordingly, the relay time slots may be used to permit each user aircraft in the community to receive relayed data from any other user aircraft or the control aircraft. The data transmitted in the relay slots can also include IFF data which will serve to identify a member aircraft as "friend" or "foe". It may be noted, however, that it would be difficult for a "foe" aircraft to join the community because the "foe" aircraft must occupy the right time slot, use the same Barker codes, and have the same clock frequency. It is believed apparent that the TSRS portion of the navigation system of the invention can accomodate an extremely large number of control and user aircraft merely by extending the length of the system cycle and the number of user slots in the cycle. Furthermore, the transmission of digitally encoded serial data provides for jam resistant communication links between the tactical members of the community.

Referring again to FIG. 3 of the drawings, the TSRS controller unit 40 is shown as providing a TSRS control output to the digital unit 38. This control output is shown schematically and may include a number of control functions for the TSRS portion of the navigation and communication system of the invention. Apart from a power ON/OFF control function, the controller unit 40 may also include a logic reset switch which may be employed to reset the logical units in the digital unit 38 to standard or "initial" conditions. If desired, various fine and coarse sync lockout controls may also be incorporated to accomodate system testing or a particular system requirement. In the overall system illustrated in FIG. 3 of the drawings, a source of altitude information is provided in the form of altimeter 150. The altimeter 150 may comprise a barometric altimeter or any other suitable type of altimeter capable of providing digitally-encoded altitude information H in a form suitable for use with the digital computer 25. It may be noted that altitude information in other forms is available from the other units in the navigation system of the invention. The inertial measuring unit 35 provides a Z axis acceleration output from which Z axis velocity and position can be determined. Since the TSRS portion of the navigation system of the invention provides radio range measurements, it will not provide relative altitude information with respect to aircraft in the community unless transmissions from two pairs of aircraft are employed. However, when ground TSRS stations are utilized, the altitude of the TSRS-equipped aircraft may be determined by slant range readings to the ground stations. In a similar fashion, X axis and Y axis information derived from the inertial navigation system is supplemented by the X and Y axis range information derived from the TSRS portion of the navigation system. When required, velocity and positional information derived from satellite navigation systems or Loran or Omega systems may be fed into the digital computer 25 to provide further sources of long term accurate navigation information.

The basic system shown in FIG. 3 of the drawings also includes an indicator panel 151 which may provide visual or aural signals indicating various system functions or malfunctions. For example, signals indicating the fine sync status and fine sync error derived from the TSRS digital unit 38 may be applied to the indicator panel to provide pilot warnings. Similarly, indications of computer 25 failure, inertial navigation system alignment and inertial navigation system failure may also be included. The pilot may be signalled that his overall navigation system operation has been improved by the transmission of updated navigational information from the control aircraft. The pilot may also be signalled that a relative grid has been established by a control aircraft in his vicinity, so that he may join in the operation of the tactical community, if desired. In the illustrated system, provision is also made in the indicator panel 151 for advising the pilot that data has been received and recorded. This data may be the serial data transmitted by the TSRS portion of the navigation system and may include navigational or other types of information.

The digital computer 25 shown in FIG. 3 of the drawings is the central point of the system to which both inertial data and TSRS data are transmitted and processed. The digital computer for the system may comprise a general purpose binary computer, such as U.S. Department of Defense Type No. AN/ASN 91, for example, which has a 16,384 word storage core and a cycle time of 2.5 Ms. The average executive time of such a computer is 125,000 operations per second and the computer may have 5 output channels, 8 input channels, 67 discrete inputs and 32 discrete outputs.

The digital computer 25 performs a number of functions in the tactical navigation and communication system of the invention which are controlled and implemented by its operational computer program (OCP). In the performance of its functional duties, the following specific operational tasks are performed:

1. Pure inertial geographic navigation and ground alignment.
2. TSRS processing.
3. TSRS/inertial hybrid navigation and Kalman filter time propagation.
4. Relative grid definition and acquisition.
5. TSRS/inertial hybrid navigation and Kalman filtering with geographic update through observations.

Within the context of these five software tasks, the operational computer program provides a dual grid navigation capability. Navigation in both relative grid and geographic grid coordinates is provided for all system members with the following basic software hybrid navigation system outputs:

a. Geographic Latitude ($\lambda$)
b. Geographic Longitude ($\phi$)
c. Geographic Altitude (h)
d. Geographic North Velocity ($V_N$)
e. Geographic East Velocity ($V_E$)
f. Geographic Vertical Velocity ($V_{UP}$)
g. Relative Grid U-Axis Position ($P_U$)
h. Relative Grid V-Axis Position ($P_V$)
i. Relative Grid W-Axis Position ($P_W$)
j. Relative Grid U-Axis Velocity ($V_U$)
k. Relative Grid V-Axis Velocity ($V_V$)
l. Relative Grid W-Axis Velocity ($V_W$).

The ability to navigate in two grid coordinate systems is provided by the operational computer program or airborne "software" when the navigational information from the inertial measuring system is periodically updated by navigational information derived from the TSRS portion of the overall system. The TSRS itself is capable of providing accurate georeferenced information when it operates in conjunction with ground based TSRS stations. As mentioned previously, the georeferenced information may also be derived from satellite systems, Omega or Loran. For example, dual grid navigation capability results when a TSRS-equipped control aircraft operates in conjunction with a TSRS ground station and a TSRS-equipped user aircraft. The operational computer program provided is such as to enable an aircraft in the tactical community to operate as a controller or user. When the computer program is designated for use in a controller, the program defines the relative grid coordinate system within which the tactical community operates. Accordingly, each aircraft in the community may be designated as a controller or a user since a basic operational computer program is given to each member of the community. When external sources of georeferenced information, such as satellite, Omega or Loran systems, are employed, the control aircraft must be specially equipped to receive these signals. Regardless of whether the member aircraft is a controller or a user, the computer program causes the computer 25 to output relative grid position data and grid parameters to the TSRS for transmission as serial data.

The operational computer program may provide for two basic modes of operation for the user aircraft, namely, an "active" mode and a "passive" mode. In the active mode, the TSRS of the user transmits radio waves. In the passive mode, the user's TSRS only receives. For both active and passive modes and for both control and user aircraft, the computer program may provide for an in-flight alignment to both the relative grid coordinate system and the geographic grid system. When TSRS-equipped ground stations are available, the computer program updates the stored geographic position coordinates in the computer with the geographic position coordinates of the TSRS ground stations. In all modes of operation, the computer programming cooperates with the TSRS to permit each member of the tactical community to be identified. Additionally, in both active and passive modes, the system of the invention provides navigation capability in controller relative time and frequency as well as relative position and velocity. This is accomplished in the active mode by the TSRS time synchronization procedure previously described. In the passive mode, the operational computer program provides the means for time synchronization of the user to the controller.

Figure 7:
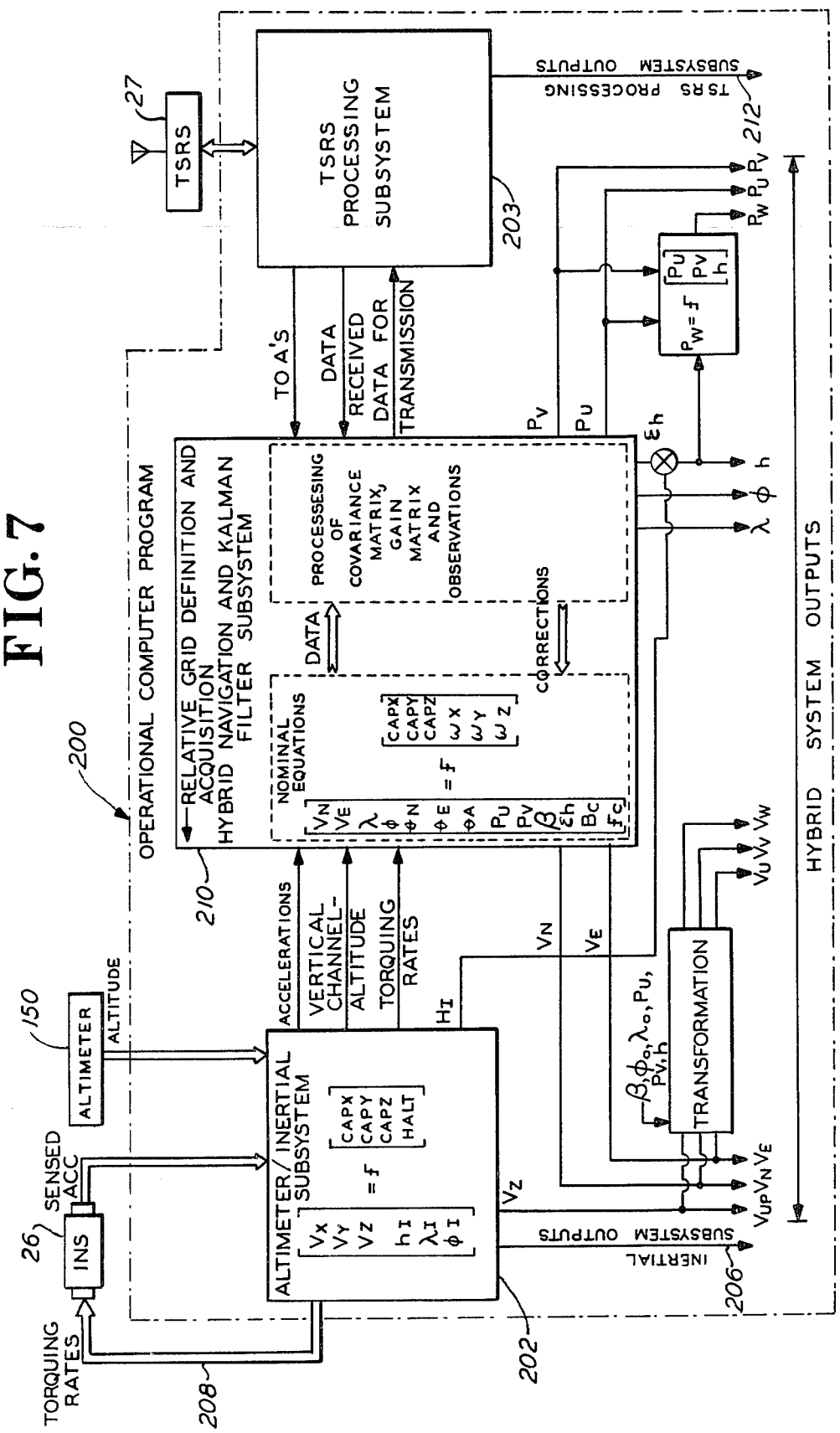
FIG. 7 is a functional diagram depicting the major subsystems in the operational computer program for the digital computer shown in FIG. 3 of the drawings.

A functional representation of the required operational computer program 200 is shown in FIG. 7 of the drawings. The inertial navigation system 26 is shown supplying three axis acceleration information to an altimeter/inertial subsystem 202 of the program. Altimeter 150, as noted previously, supplies barometric altitude information to the altimeter/inertial subsystem 202. The TSRS system 27 supplies ranging data from the controller and/or other user aircraft and ground stations, relative grid origin data, and relative grid position data of the controller and other users to a TSRS processing subsystem 203. The altimeter/inertial subsystem 202, in accordance with well known computational techniques, processes the inertial navigation system and altimeter inputs to provide pure inertial outputs on output data bus 206. The pure inertial outputs include velocity, latitude, longitude and altitude and can be provided where the inertial system is operating without the aid of a georeferenced updating system. The TSRS processing subsystem 203 provides the primary interface between the TSRS input data from system 27 and a hybrid navigation subsystem 210. Additionally, the TSRS processing subsystem may provide range information and relative grid origin and position data on an output data bus 212.

The altimeter/inertial subsystem 202 and the TSRS processing subsystem 203 interface with the hybrid navigation subsystem 210 wherein is contained the necessary software to perform the TSRS/inertial hybrid navigation and Kalman filter time propagation function, the relative grid definition and acquisition function, and the TSRS/inertial hybrid navigation and Kalman filtering with geographic update through observations function previously mentioned. To this end, the hybrid navigation subsystem 210 receives acceleration data, vertical channel and altitude data, and gyro torquing rate data from the altimeter/inertial subsystem 202. Additionally, ranging data (TOA's) from other user aircraft, ground stations or controller aircraft, grid origin data, grid position data, and synchronization data is supplied to the hybrid navigation subsystem from the TSRS processing subsystem. The hybrid navigation subsystem processes this information, including the application of Kalman filtering techniques, to provide the best estimate of the geographic and relative grid parameters mentioned above.

The following is a detailed description of the five basic tasks implemented by the operational computer program:

1. Pure Inertial Geographic Navigation and Ground Alignment

A. Inertial Measuring System Ground Alignment and Auto Calibration.

The operational computer program performs inertial measuring system ground alignment and autocalibration consisting of three axis Inertial Measurement Unit (IMU) fine alignment, two level gyro axis bias calibration, and vertical accelerometer bias calibration. IMU fine alignment includes the capability to fine align the platform cluster to a specified attitude with respect to North, West, and Up. It also provides an in-flight inertial measuring system start-up capability. The ground align mode is initiated by a setting on the inertial measuring system controller 37 to "ground align". Within this mode, a measure-take-action procedure is followed. During the measurement sequences, the cluster is torqued with nominal earth's rate and best apriori drifts. In this configuration, it is allowed to free drift at its error rate and the platform sensed velocity is monitored. Velocity error buildup is then fit to a polynomial in time, with the coefficients proportional to initial tilt and channel drift. After sufficient filtering time has elapsed, the tilt angles, heading error, and gyro drifts can be extracted and action is then taken to correct them. A fifteen sequence procedure is utilized for this function.

Sequence 0. This is a hardware-controlled startup sequence which includes a coarse erection and azimuth cage to a fixed heading.

Sequence 1. At the completion of sequence 0, the digital computer 25 assumes control of sequencing and, following the input of IMU constants such as gyro and accelerometer biases and scale factors, and vehicle position, latitude and longitude, enters Sequence 1. Sequence 1 consists of two rapid coarse tilt estimations, each followed by a corrective torquing period to remove the recovered tilt error. Each coarse tilt estimation cycle consists of 75 sensed velocity samples. Furthermore, the gyros are torqued in an earth biased configuration. The X and Y tilts are computed as a function of the IMU-derived velocities. After completion of the estimation period, action is taken to remove the recovered tilts. A nominal digital torquing rate of 50 Deg/Hr. is applied during the torquing interval to remove the tilts while applying the nominal rates. At the conclusion, the estimation and corrective action is then repeated once again before entering Sequence 2.

Sequence 2. Sequence 2 refines the estimate of coarse azimuth and verticality. In addition, the gyros are torqued as in Sequence 1 with nominal rates. The X, Y and Z tilts and X and Y drifts are computed as a function of the IMU-derived velocities and regression coefficients, i.e., the coefficients proportional to initial tilt and channel drift.

Sequence 3. In Sequence 3, the attitude errors are torqued out which were estimated in Sequence 2. In addition, the cluster is slewed 90 degrees about azimuth in order to orient the West gyro (Y) input axis North for calibration. The computer 25 issues the appropriate discretes for the analog slew of the cluster as well as for providing digital commands to torque out verticality errors. A nominal 50 Deg/Hr digital torquing rate is used to apply the nominal rates and correct the tilt errors. The azimuth analog slew rate is then used to slew the platform to its proper orientation.

Sequence 4. Sequence 4 performs five of the estimation and correction action periods discussed in Sequence 1 in order to measure the resultant tilt and remove it. The nominal gyro torquing rate equations are changed from those in Sequence 3 to reflect the change in cluster orientation. The nominal rates used in this sequence are also used in Sequence 5 through Sequence 8.

Sequence 5. Sequence 5 provides a coarse alignment estimation which allows additional time for platform warmup. The nominal torquing rates used in Sequence 4 are used again. Furthermore, the X, Y and Z tilts and X and Y drifts are computed as a function of the IMU-derived velocities and regression coefficients in this platform orientation.

Sequence 6. Sequence 6 is used to slew out the coarse heading estimate and tilts measured in Sequence 5. The computer issues the appropriate discretes to analog slew and digitally torque azimuth and vertical errors respectively. The nominal torquing rates used are the same as in Sequence 5 as the platform is 90 degrees off from its nominal orientation. After the tilt errors are removed by digitally torquing the platform, the maximum azimuth analog slew rate is applied to remove the heading error recovered in Sequence 5.

Sequence 7. Sequence 7 is identical to sequence 4.

Sequence 8. Sequence 8 is a computation sequence where the West (Y) gyro and vertical accelerometer bias are both calibrated. The gyros are digitally torqued and the IMU-derived velocities are computed as in Sequence 5. In the estimation equations, the number of samples processed is 1500 (NF). The West (Y) gyro bias and vertical accelerometer bias are both updated from the old values prior to the end of the sequence.

Sequence 9. Sequence 9 is used to digitally torque out the tilts measured in Sequence 8 and to slew the cluster 90 degrees in azimuth. The computer issues the appropriate discretes to analog slew the cluster in azimuth and provides digital commands to torque out verticality errors. Nominal 50 Deg/Hr torquing rates are used to correct the tilt errors while torquing the platform to compensate for earth's rate. The same nominal earth rate compensations are used that were used in sequence 8. With the digital torquing complete, the maximum azimuth analog slew rate is used to slew the platform back to its nominal orientation.

Sequence 10. Sequence 10 is an iterative tilt correction sequence which is identical to Sequence 4. The nominal torquing rates used are the same as Sequence 1.

Sequence 11. Sequence 11 is a coarse alignment estimation sequence used to correct errors which may exist following the slew of 90 degrees. The sequence is identical to Sequence 2.

Sequence 12. Sequence 12 is a cluster slew for purposes of correcting the errors recovered in Sequence 11. The sequence is identical to Sequence 3 except without the 90 degrees azimuth slew.

Sequence 13. Sequence 13 is an iterative tilt correction sequence which is identical to sequence 10. The nominal torquing rates used are the same as in Sequence 1.

Sequence 14. Sequence 14 provides North gyro and vertical accelerometer calibration and fine cluster alignment estimation. The same nominal torquing rates are used as in Sequence 1. The X, Y and Z platform tilts are computed as a function of the IMU-derived velocities and regression coefficients. Furthermore, the North (X) gyro bias and vertical accelerometer bias are updated after calibration.

Sequence 15. Sequence 15 is a fine cluster slew sequence used to correct the attitude error recovered in Sequence 14 and 15, the final sequence in ground alignment. The nominal torquing rates used are identical to the ones used in Sequence 1. With the angles torqued out, the align-complete discrete is issued and transfer goes back to the start of Sequence 14. Until the system is switched to the Normal mode from the inertial measuring system controller, looping is continued through Sequence 14 and 15.

B. Pure Inertial Geographic Navigation. The operational computer program does not perform the inertial navigation computations until all fifteen sequences in the previously described inertial measuring system ground alignment and autocalibration have been completed. In this phase, the following quantities are computed based upon sensed acceleration inputs from the inertial measuring system 26:

a. North (x) Velocity
b. West (y) Velocity
c. Latitude
d. Longitude
e. x Gyro Torquing Rate
f. y Gyro Torquing Rate
g. z Gyro Torquing Rate Also, geographic altitude $H_I$, above sea level, provided by the altimeter/inertial vertical channel navigation is used in these computations. The computed gyro torquing rates are applied to the inertial measuring system torquers to maintain a local vertical North-pointing cluster attitude.

At the beginning of Sequence 14 in the ground alignment and autocalibration mode, the altimeter/inertial vertical channel computations are initiated by the operational computer program. This early initiation allows a second order altimeter damped computational loop to reach steady state prior to entry of inertial navigation. This loop computation utilizes the inertial measuring system vertical accelerometer sensed velocity changes together with altimeter-indicated altitude inputs to determine the following two geographic navigation variables:

a. Up (z) Velocity, and
b. Altitude Above Sea Level.

The computer program in addition utilizes North and West velocity and latitude from the above computations and the hybrid subsystem estimated inertial system platform tilt errors in the loop equations hereinafter described. North and West velocity is taken as zero in these equations prior to inertial navigation. A validity check can be incorporated in the loop as a criterion for opening the loop during flight while in vertical maneuvers.

During each of the estimation sequences, the IMU-derived velocity is computed and its buildup fit to a second order polynomial in time using maximum likelihood filtering techniques. The velocities are computed from the platform-sensed velocity changes as follows:

(1) $V_x(t) = V_x(t - \Delta t_N) + CAP_x$ (2) $V_y(t) = V_y(t - \Delta t_N) + CAP_y$, where $Cap_x$ and $CAP_y$ are the sensed velocity changes from the inertial measuring system 26, $\Delta t_N$ is the inertial subsystem navigation iteration interval, and t is running time in the sequence. For estimation purposes, the velocity buildup is modelled as a second order polynomial in time as follows:

$$V_x(t) = A_x t + B_x t^2 \quad (3)$$
$$V_y(t) = A_y t + B_y t^2 \quad (4)$$

fit Model.

The A and B coefficients are estimated using a maximum likelihood filtering technique are given by the following equations:

$$A_{x,y} = \frac{1}{\Delta t_N} \left[ \frac{\left(\sum_{N=0}^{NF} N^4\right)\left(\sum_{N=0}^{NF} NV_i\right) - \left(\sum_{N=0}^{NF} N^2 V_i\right)\left(\sum_{N=0}^{NF} N^3\right)}{\left(\sum_{N=0}^{NF} N^2\right)\left(\sum_{N=0}^{NF} N^4\right) - \left(\sum_{N=0}^{NF} N^3\right)^2} \right] \quad (5)$$

$$B_{x,y} = \frac{1}{\Delta t_N^2} \left[ \frac{\left(\sum_{N=0}^{NF} N^2\right)\left(\sum_{N=0}^{NF} N^2 V_i\right) - \left(\sum_{N=0}^{NF} N^3\right)\left(\sum_{N=0}^{NF} NV_i\right)}{\left(\sum_{N=0}^{NF} N^2\right)\left(\sum_{N=0}^{NF} N^4\right) - \left(\sum_{N=0}^{NF} N^3\right)^2} \right] \quad (6)$$

where N is the velocity sample number (1, 2, 3--NF), $\Delta t_N$ is the time between samples, and $V_i$ is given by the expression $$V_i = \begin{cases} V_x(N\Delta t_N) & \text{For } A_x \text{ and } B_x \quad (7) \\ V_y(N\Delta t_N) & \text{For } A_y \text{ and } B_y. \quad (7) \end{cases}$$

When switched to the navigate mode, and at the beginning of a Kalman cycle, the navigation equations are entered with initial horizontal velocities set to zero. These computations are exercised following the ground alignment and autocalibration mode. Upon initialization of inertial navigation, the scale factor of the integrator producing the sensed velocity changes is changed from high gain mode used for alignment to low gain mode for actual system operation. Initial values of velocity and latitude and longitude are as defined from ground alignment.

During inertial navigation, the gyros are torqued with the following rates:

(8) $\omega_x = \omega_3 \cos \lambda_I + \rho_x - D_{xRA}$ (9) $\omega_y = \rho_y - D_{yRA}$

(10) $\omega_z = \omega_e \sin \lambda_I + \rho_z - D_{zRA}$, where:
$\lambda_I$ = Computer Derived Latitude,
$\omega_e$ = Earth's Polar Rate,
$D_{xRA}$, $D_{yRA}$, $D_{zRA}$ = North, East, and Azimuth Apriori Gyro Drift Rates, and $\rho_x$, $\rho_y$, $\rho_z$ = Angular Rates of the Platform with respect to Earth. The angular rates with respect to earth are computed from platform velocity equations as follows:

$$\rho_x = \frac{-V_y}{R_e + h_I} \quad (11)$$

$$\rho_y = \frac{V_x}{R_N + h_I} \quad (12)$$

$$\rho_z = \frac{-V_y \tan \lambda_I}{R_e + h_I}, \quad (13)$$

where $V_x$ and $V_y$ are the computed North and West platform velocities and $h_I$ is an altimeter/inertial-derived altitude derived from the second order, altimeter damped vertical loop. The earth's radii components, $R_N$ and $R_E$, are computed as a function of latitude and the earth's eccentricity from the following equations:

$$R_N = R_e \left( \frac{1 - E^2}{(1 - E^2 \sin^2 \lambda_I)^{3/2}} \right) \quad (14)$$

$$R_E = R_e \left( \frac{1}{(1 - E^2 \sin^2 \lambda_I)^{\frac{1}{2}}} \right), \quad (15)$$

where $R_e$ is the Earth's equatorial radius ($2.0925738 \times 10^7$ ft.) and $E^2$ is the Earth's eccentricity (0.00674499984).

The platform-derived ground velocities are updated each iteration ($\Delta t_N$) as follows:

$$V_x(t) = V_x(t - \Delta t_N) + CAP_x + \int_{t - \Delta t_N}^{t} \dot{V}_{xCOR} dt \quad (16)$$

$$V_y(t) = V_y(t - \Delta t_N) + CAP_y + \int_{t - \Delta t_N}^{t} \dot{V}_{yCOR} dt, \quad (17)$$

where $CAP_x$ and $CAP_y$ are the sensed delta ($\Delta$) velocities over $\Delta t_N$ and $\Delta t_N$ is the computer iteration interval. $\dot{V}_{xCOR}$ and $\dot{V}_{yCOR}$ are the two components of coriolis acceleration and are given by the expressions:

$$\dot{V}_{xCOR} = -V_z \rho_y + [\rho_z + 2\omega_e \sin \lambda_I] V_y \quad (18)$$

$$\dot{V}_{yCOR} = V_x[\rho_x + 2\omega_e \cos \lambda_I] - V_x[\rho_z + 2\omega_e \sin \lambda_I], \quad (19)$$

where $V_z$ is derived from the second order, altimeter damped loop.

The platform-derived latitude and longitude are computed by integrating the ground velocities every $\Delta t_N$ and are given by the following expressions:

$$\lambda_I(t) = \lambda_I(t - \Delta t_N) + \int_{t - \Delta t_N}^{t} \frac{V_x}{(R_N + H_I)} dt \quad (20)$$

$$\phi_I(t) = \phi_I(t - \Delta t_N) - \int_{t - \Delta t_N}^{t} \frac{V_y}{(R_E + H_I) \cos \lambda_I} dt, \quad (21)$$

where $\lambda_I(t)$ is the inertially-derived latitude, $\phi_I(t)$ is the inertially-derived longitude, $V_x$ and $V_y$ are North and West platform ground velocities, and $H_I$ is altimeter/inertial-derived altitude.

Again, the vertical velocity channel provides the third component of velocity and altitude for the inertial subsystem geographic navigation. The navigation equations previously described utilize directly the outputs of the vertical velocity channel. Horizontal velocity information required by the vertical channel is obtained from the inertial subsystem geographic navigation computations.

The vertical velocity channel computation is initiated at the beginning of Sequence 14 of the ground alignment mode. The vertical velocity channel is configured as a second order, altimeter damped feedback loop with compensation for altimeter transport lag, i.e., the response time of the altimeter system. Instantaneous vertical velocity is obtained by integrating the vertical acceleration. In order to achieve long term total velocity, the barometric altitude is held as an independent reference to compare with this instantaneous signal. The difference between inertial-derived altitude and barometric altitude is fed back to eliminate the effects of runaway error which accompany an open-loop double integration of residual accelerometer bias error. The vertical channel equations which characterize this second order loop are as follows:

$$\dot{V}_z = \frac{CAP_z + \theta_N CAP_y + \theta_e CAP_x}{\Delta t_N} + \quad (22)$$
$$\rho_y V_x - (2\omega_e \cos \lambda_I + \rho_x)V_y - (\Delta h)d_1, \quad (23)$$

$$V_z = V_{zO} + \int_0^t \dot{V}_z dt, \quad$$

$$H_I = h_{IO} + \int_0^t [V_z - (\Delta h) d_2] dt, \quad (24)$$

where $CAP_z$ is accelerometer change is sensed velocity over $\Delta t_N$(ft/sec), $\rho x$ is the x—resolved angular velocity of platform with respect to earth (rad/sec), $\rho y$ is the y—resolved angular velocity of platform with respect to earth (rad/sec), $\omega e$ is earth's rate (rad/sec), $\lambda I$ is latitude (rad), $H_I$ is inertial/altimeter-derived altitude, $V_x$ is north Velocity (ft/sec), $V_y$ is west velocity (ft/sec), $\Delta h$ is difference between inertial and barometric altitude (ft), $V_{zO}$ is initial vertical velocity going into the inertial mode (ft/sec) (zero), $h_{IO}$ is initial altitude (ft) as indicated by altimeter, $d_1$ is a constant (1/sec$^2$), $d_2$ is a constant (1/sec), $\theta_N$ is hybrid navigation estimated North platform tilt, and $\theta_E$ is hybrid navigation estimated East platform tilt.

Because of the double numerical integration required to obtain $H_I$, the algorithm utilized is critical. The vertical velocity and altitude computations therefore are mechanized with a predictor—corrector integration algorithm presented as follows:

a. Predictor $$V_{zp}(t) = V_z(t - \Delta t_N) + CAP_z + \theta_N CAP_y + \theta_E CAP_x - \quad (25)$$
$$d_1 \Delta h (t - \Delta t_N) \Delta t_N -$$
$$[2\omega_e \cos \lambda_I + \rho_x] V_y(t) \cdot \Delta t_N +$$

-continued $$(26)\ \dot{h}_{Ip}(t) = V_{zp}(t) - d_2 \Delta h(t - \Delta t_N)$$

$$(27)\ h_{Ip}(t) = h_I(t - \Delta t_N) + \dot{h}_{Ip}(t) \cdot \Delta t_N$$

$$(28)\ h_{Dp}(t) = \lambda_1 h_{Ip}(t) + \lambda_2 h_I(t - \Delta t_N) + \lambda_3 h_I(t - 2\Delta t_N)$$

$$(29)\ \Delta h_p(t) = h_{Dp}(t) - h_{ALT}(t);\ \text{and}$$

b. Corrector $$\begin{aligned}(30)\ V_z(t) = \\ V_z(t - \Delta t_N) + CAP_z + \theta_N CAP_y + \theta_E CAP_x - \\ d_1 [\Delta h(t - \Delta t_N) + \Delta h_p(t)] \Delta t_N/2 - \\ [2\omega_e \cos \lambda_I + \rho_x] V_y(t) \cdot \Delta t_N + \\ \rho_y V_{x(t)} \Delta t_N\end{aligned}$$

$$(31)\ \dot{h}_I(t) = V_z(t) - d_2 \Delta h_p(t)$$

$$(32)\ h_I(t) = h_I(t - \Delta t_N) + [\dot{h}_I(t - \Delta t_N) + \dot{h}_I(t)] \Delta t_N/2$$

$$(33)\ h_D(t) = \lambda_1 h_I(t) + \lambda_2 h_I(t - \Delta t_N) + \lambda_3 h_I(t - 2\Delta t_N)$$

$$(34)\ \Delta h(t) = h_D(t) - h_{ALT}(t),$$

where $V_z$ is the vertical velocity (subscript "p" indicates predictor cycle), $\Delta t_N$ is the computer iteration (parenthesis are used to indicate the computer iteration cycle the variable is derived from), $h_{ALT}$ is the altimeter processing derived altitude, $CAP_z$ is the change in sensed velocity, $d_1$ is a constant, 0.00111 (1/sec 2), and $d_2$ is a constant, 0.06666 (1/sec). $\lambda 1, \lambda 2, \lambda 3$ are constants depending on altimeter transport lag and are given by the expressions:

$$(35)\ \gamma_1 = 1.0 - 1.5[TAV/\Delta t_N] + 0.5[TAV/\Delta t_N]^2$$

$$(36)\ \gamma_2 = 2.0[TAV/\Delta t_N] - [TAV/\Delta t_N]^2$$

$$(37)\ \gamma_3 = 0.5\{[TAV/\Delta t_N]^2 - [TAV/\Delta t_N]\},$$

where TAV is the nominal value of altimeter transport lag which is a fixed constant.

The vertical velocity and altitude computations are initiated at the start of the first pass of Sequence 14 in the ground align mode. While the system remains in the ground align mode, the coriolis corrections in the vertical channel equations use $V_x = V_y = 0$. When the system is switched to "Navigate", $V_x$ and $V_y$ are derived from the inertial subsystem geographic navigation. From the start of Sequence 14, the vertical channel uses $h_{ALT}$, the altimeter-derived altitude, as the reference. When the loop is started, $V_{zo}$ is set to zero and altitude $h_{IO}$ is initialized to the indicated altimeter input. Vertical velocity, $V_z$, is not reset to zero upon entry to "Navigation". For inflight start-up, the loop is initiated at the beginning of inertial navigation.

2. TSRS Data Processing. The TSRS data processing subsystem, whose operation is described in detail above, provides the primary interface between the TSRS input data and the hybrid navigation subsystem. This computational subsystem of the OCP reads and operates on TSRS input data during either the Inertial TSRS or ITNS mode. The following data is obtained from TSRS once every system cycle (2.69 sec).

a. Grid origin coordinates $\lambda_o, \phi_o$
b. Ground station grid azimuth $\delta$
c. Other aircrafts relative grid coordinates
d. Grid data status
e. TOA data from controller and/or user slots.

In addition hybrid navigation subsystem indicated relative grid position coordinates are outputed by the OCP once every system cycle.

The computer accepts from the TSRS, time-of-arrival in counts, and the data message sent by other aircraft in their appropriate slots. Tabulated in Table I is a preferable grouping of data words, with an appropriate range and transmission resolution for a working system.

TABLE I

| | DATA WORDS | | |
|---|---|---|---|
| | PARAMETER | RANGE | RESOLUTION |
| a. $\lambda_o$ - | GRID ORIGIN LATITUDE (RADIANS) | $\pm \frac{\pi}{2}$ RAD. | $0.5 \times 10^{-6}$ RAD. |
| b. $\phi_o$ - | GRID ORIGIN LONGITUDE (RADIANS) | $\pm \pi$ RAD. | $0.5 \times 10^{-6}$ RAD. |
| c. $\delta$ - | GROUND STATION AZIMUTH IN GRID (RADIANS) | $\pm \pi$ RAD. | $0.1 \times 10^{-4}$ RAD. |
| d. $P_u$ - | U AXIS GRID POSITION (FT) | $\pm 600000$ FT. | 5 FT. |
| e. $P_v$ - | V AXIS GRID POSITION (FT) | $\pm 600000$ FT. | 5 FT. |
| f. $P_w$ - | W AXIS GRID POSITION (FT) | $-10000$ FT. 40000 FT. | 5 FT. |
| g. STATUS | WORD (3 BITS) DATA AVAILABLE OFFSET OR LOCAL GRID DEFINED $\delta$ ANGLE VALID | 0,1 0,1 0,1 | |

3. TSRS/Inertial Hybrid Navigation and Kalman Filter Time Propagation. The OCP enters the hybrid navigation subsystem mode at the same time the inertial subsystem navigation is initiated. Following ground alignment the input from a setting change on the ASN-90 controller to NORMAL, together with completion of the offnominal platform orientations command initiates both inertial subsystem navigation and hybrid subsystem navigation. The hybrid navigation subsystem processes the navigation data from the IMS and the data words from the TSRS and provides the following navigation parameters in Geographic and Relative grid coordinates.

a. North Geographic Velocity ($V_N$)
b. East Geographic Velocity ($V_{GE}$)
c. Up Geographic Velocity ($V_{UP}$)
d. U Axis Relative Grid Velocity ($V_u$)
e. V Axis Relative Grid Velocity ($V_v$)
f. W Axis Relative Grid Velocity ($V_w$)
g. Latitude ($\lambda$)
h. Longitude ($\phi$)
i. Altitude (h)
j. U Axis Position ($P_u$)

k. V Axis Position ($P_v$)
l. W Axis Position ($P_w$)
m. Grid Indicated Latitude ($\lambda_R$)
n. Grid Indicated Longitude ($\phi_R$)

A Kalman filter data processing function is utilized by the OCP to provide the best estimates of the above hybrid navigation subsystem parameters. The Kalman filter performs the function of optimally mixing TOA observation data from TSRS with IMS navigation data, in the presence of noise in both hardware subsystems, and provides a central memory area for all estimated navigation parameters. The system's best estimate of any of the above navigation parameters is generated and maintained in the hybrid navigation computational subsystem. In no cases are the parameters computed in this hybrid subsystem sent as commands to affect either the IMS or TSRS computational subsystems. The quasilinear Kalman filter, utilized by the OCP to perform the data mixing, operates with a state vector the size of which varies depending on the trade off between computer computational capacity and system accuracy. A suitable state vector might consist of the following thirteen elements:

| | | |
|---|---|---|
| $\theta_E$ | $X_1$ | Tilt About East Cluster Axis |
| $\theta_N$ | $X_2$ | Tilt About North Cluster Axis |
| $\theta_A$ | $X_3$ | Cluster Azimuth Misalignment From North |
| $V_4$ | $X_4$ | North Geographic Velocity |
| $V_{gE}$ | $X_5$ | East Geographic Velocity |
| $\lambda$ | $X_6$ | Aircraft Geographic Latitude |
| $\phi$ | $X_7$ | Aircraft Geographic Longitude |
| $\epsilon_h$ | $X_8$ | Geographic Altitude Error |
| $P_u$ | $X_9$ | U - Coordinate of Position in Relative Grid |
| $P_v$ | $X_{10}$ | V - Coordinate of Position in Relative Grid |
| $\beta$ | $X_{11}$ | Grid Azimuth Misalignment from Geographic |
| $B_c$ | $X_{12}$ | TSRS Synchronization Bias Error |
| $f_c$ | $X_{13}$ | TSRS Synchronization Drift Error |

In addition to these 13 state vector elements the Hybrid Navigation subsystem computes three coordinates of velocity in grid coordinates ($V_u$, $V_v$, $V_w$) and a third coordinate of grid position ($P_w$). These latter four parameters are determined as a function of the 13 state vector elements modelled in the Kalman filter. The TSRS synchronization error states ($B_c$, $f_c$) allow TSRS clock synchronization in passive modes. Thus, with the hardware synchronization being provided by TSRS in active modes, the hybrid navigation capability provided here for both modes includes:

a. Geographic Position
b. Geographic Velocity
c. Relative Grid Position
d. Relative Grid Velocity
e. Relative Time
f. Relative Frequency The above thirteen element state vector is propagated over a Kalman cycle with a set of nonlinear differential equations. These equations are iteratively used to propagate the state vector. This iteration may occur every 200 msec. In addition a computation of velocity in grid coordinates ($V_u$, $V_v$, $V_2$) and W axis grid position ($P_w$) is made at the same frequency. A computation of grid indicated latitude and longitude is made less frequently and preferably every 4 seconds. This time extrapolation of the state vector utilizes information from the IMS with a dynamic model of the interrelationship between estimated inertial platform errors and hybrid navigation parameters. The relative grid computations use launch latitude and longitude as grid origin until relative grid definition and acquisition is initiated. Once an indication is made by the OCP specifying the start of a grid acquisition computation, the U and V axis position is reset to zero and grid origin coordinates switched to those specified by the grid definition and acquisition computation section. When the Controller Offset Grid Option is being used as described below, the grid origin, specified by the OCP to be used as a temporary origin to propagate the relative grid hybrid navigation computations during grid definition, is in its hybrid geographic position. Following an indication of completion of grid initialization the changes in U and V grid position computed from the reset time are transformed into actual relative grid coordinates defined by the origin latitude and longitude computed during grid definition. Following this the value of initial grid position applicable to the time when U and V axis position were reset to zero, are added to the transformed changes in U and V grid position computed from the reset time. In all other grid definition and acquisition options the grid origin coordinates specified at the initiation of grid initialization correspond to the actual controller defined relative grid. For passive mode user inertial grid acquisition, a value for initial user clock bias is obtained and used to reset the appropriate state vector element. At the initiation of inertial navigation all state vector geographic position and velocity navigation parameters are initialized to those of the inertial navigation subsystem. Relative grid position and all other elements are initialized to zero.

A transition matrix computation is iteratively performed, preferably, every four seconds. From this a total transition matrix is obtained over a full Kalman observation update cycle. The transition matrix is a linear dynamic model identifying the interrelationship over a Kalman cycle of errors in the filter state vector dynamic model. The transition matrix used over a Kalman cycle is synchronized with TSRS observation data times. Averaged trajectory parameters required in computing the transition matrices are based upon appropriate TSRS interrupt times. In a similar manner for geographic update the corresponding transition matrix is synchronized with the OCP indicated Kalman update times.

The OCP linearly propagates a covariance matrix of state vector errors utilizing the computed transition matrix. This propagation is performed once per Kalman observation cycle. Once an indication is made by the OCP specifying the completion of a grid acquisition computation, certain elements of the covariance matrix effecting the relative grid states are adjusted. This adjustment takes place with the covariance matrix valid at the first Kalman update time following the OCP indication of grid initialization complete. Also the adjustment made is dependent upon the controller or user designation identified from the appropriate switch position on the CP, 152.

The above indicated time propagation in the computer of both the state vector and the covariance matrix is carried on independent of whether TSRS observation data is processed or not.

Figure 8:
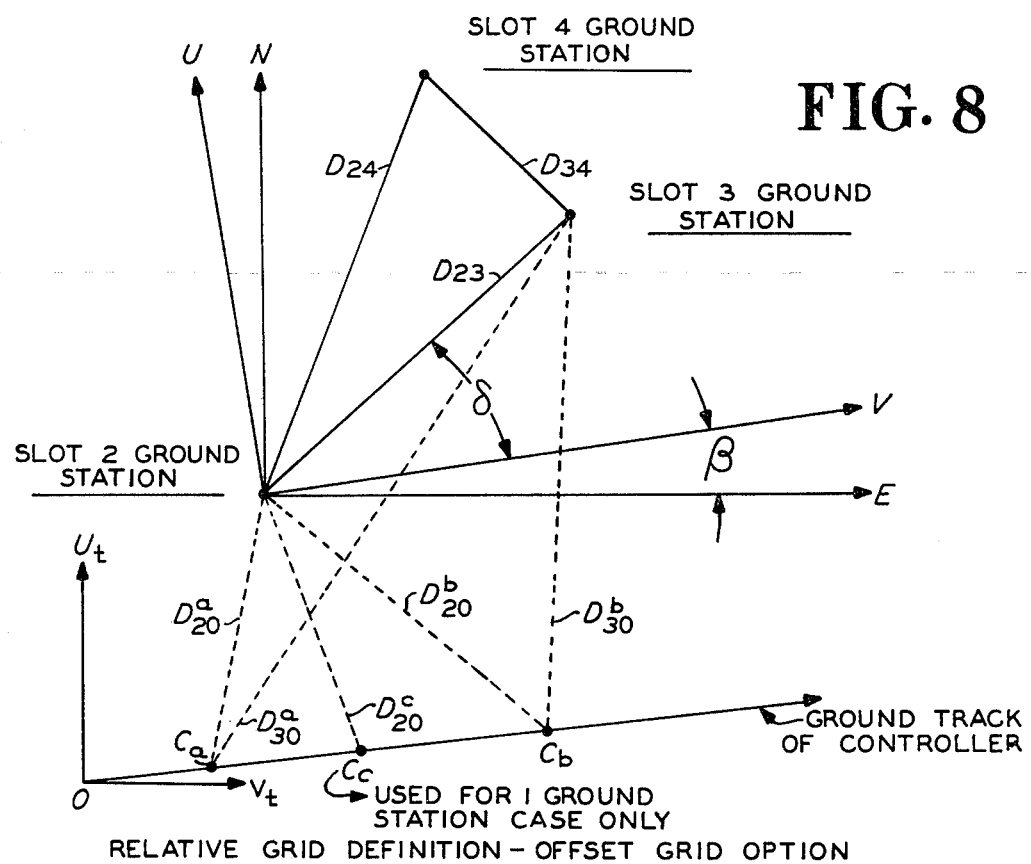
FIG. 8 is a diagram illustrating certain geometrical relationships of the relative grid for the offset grid option.

4. Relative Grid Definition and Acquisition. The procedure for defining a relative grid may be broken down into two subclasses, that is, definition with (offset grid option) or without (local grid option) ground stations. The OCP, when specified as the Controller, determines grid origin latitude and longitude ($\lambda_o$, $\phi_o$) either at a fixed ground station in the former case, or at an arbitrary point on his own trajectory, as in the latter case. It is also the OCP's responsibility in the former case to identify, through determination of the angle δ (see FIG. 8), the relative grid positions of the remaining ground stations. In all cases, one of the ground stations is placed at the grid origin. There are two options for the acquisition of the relative grid by the OCP when designated as a user. These options are denoted by the TSRS acquisition and Inertial acquisition procedures as hereinafter described:

A. Offset Grid Definition: (see FIG. 8). Following the grid initialization command from the CP, 152, grid definition is initiated and the hybrid navigation subsystem latitude, longitude, and altitude are saved and assigned as temporary grid coordinates, which may be designated as $\lambda_t$, $\phi_t$ and $h_t$, respectively.

a. $\lambda_t = \lambda$ b. $\phi_t = \phi$ c. $h_t = h$

Also, the hybrid navigation subsystem relative grid coordinates Pu, Pv and angle β are initialized to zero at the time the above geographic coordinates are saved. The point in the trajectory at which this occurs is denoted as 0. Following this initialization of temporary grid coordinates, a predetermined time later, a point $C_a$ is reached on the controller's trajectory. The OCP accepts the following data at this point in time.

a. Ranges $D_{20}{}^a$, $D_{30}{}^a$.
b. In addition, the extrapolations of the relative grid position $P_u$, $P_v$, and $P_w$ over the time it takes to get to point $C_a$ are saved and are denoted as $P_{ut}{}^a$, $P_{vt}{}^a$, $P_{wt}{}^a$.

The controller then flies for a number of Kalman cycles to point $C_b$ at which time ranges $D_{20}{}^b$ and $D_{30}{}^b$ and $P_{ut}{}^b$, $P_{vt}{}^b$, $P_{wt}{}^b$ are determined and saved. The offset grid definition and acquisition option will be effected only if one or more ground stations are available.

Figure 9:
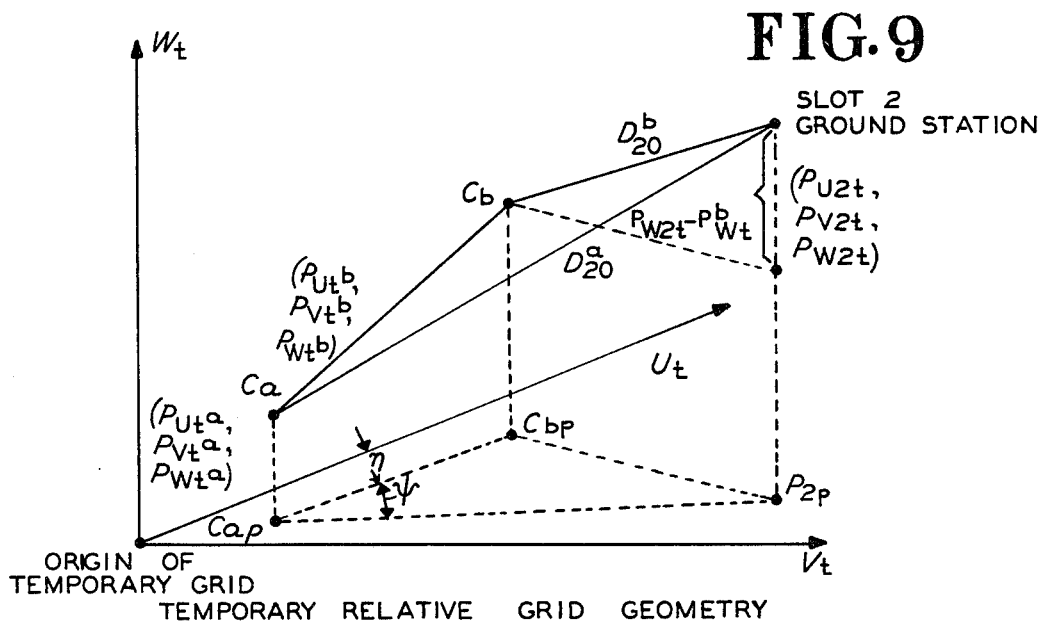
FIGS. 9 and 10 are diagrams used to explain the establishment of the origin of the relative grid.
Figure 10:
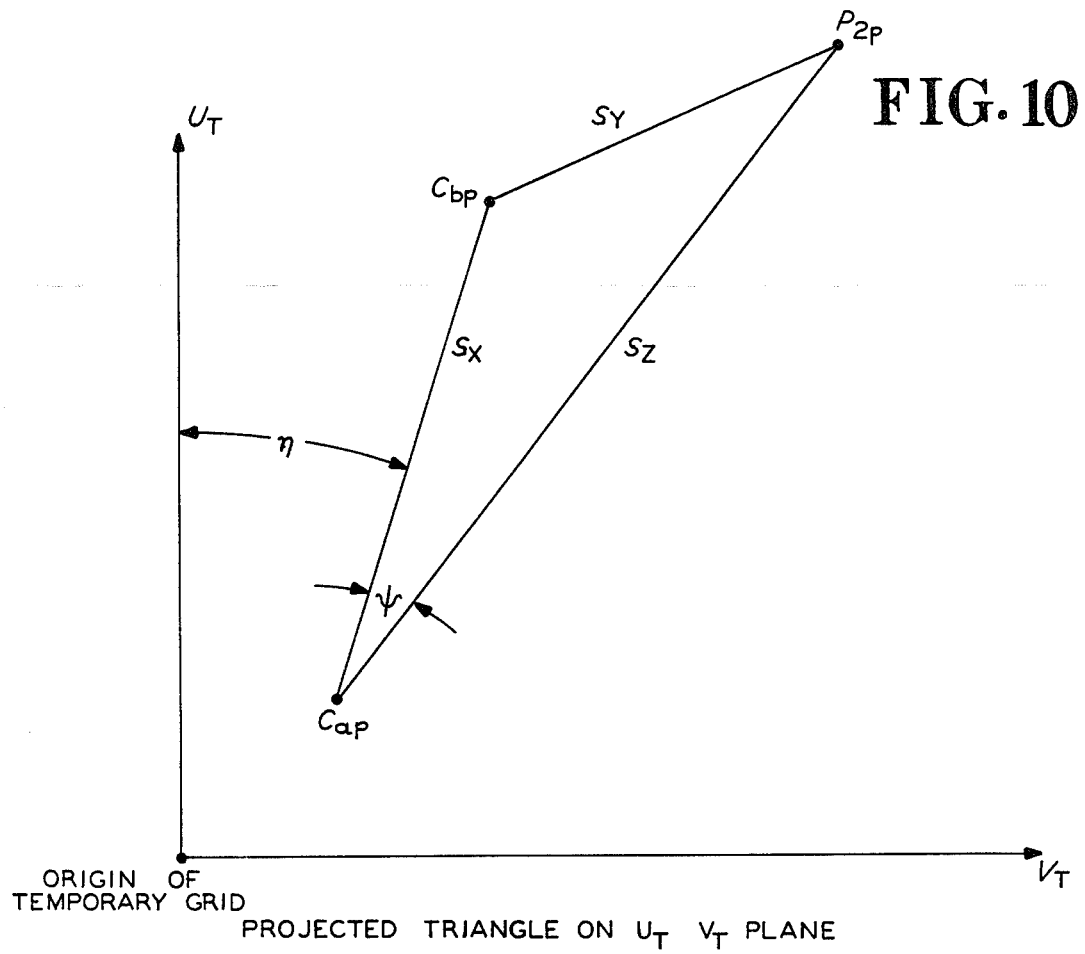

The geometric significance of the operations to follow is shown in FIGS. 9 and 10 which also define the intermediate computational variables.

Figure 11:
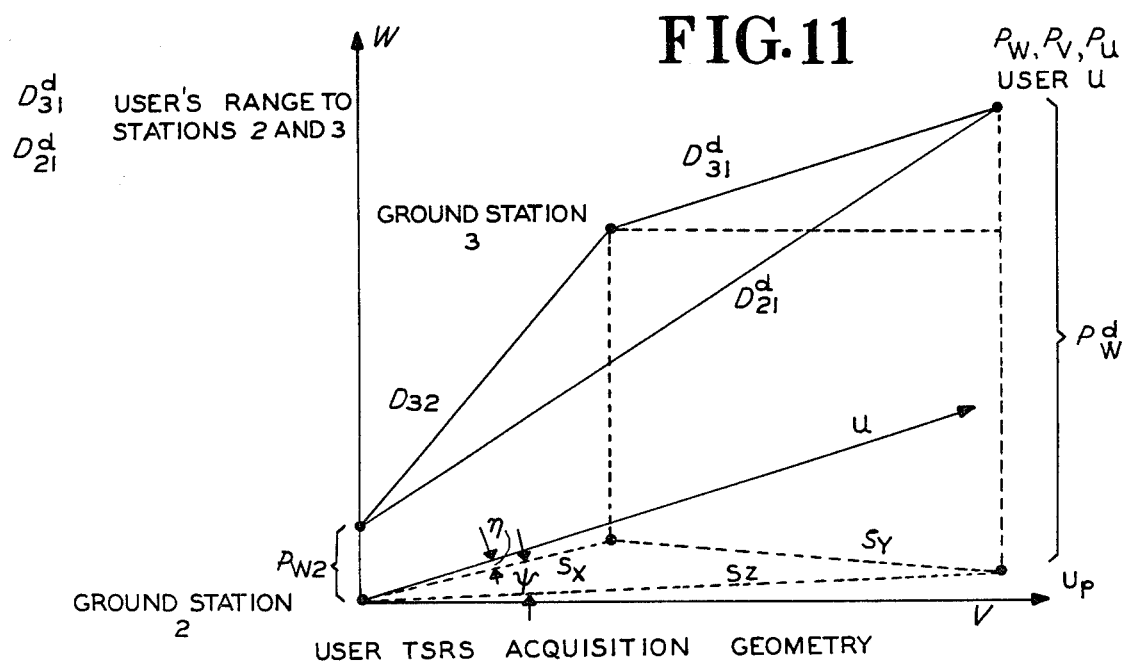
FIG. 11 is a diagram depicting certain geometrical relationships between a user aircraft and the relative grid system.

Determination of the Relative Grid Origin Coordinates For Offset Grid. Referring to FIGS. 9 and 10, the algorithm for determining $\lambda_o$, $\phi_o$, the relative grid origin coordinates is as follows:

a. The temporary relative grid coordinates of slot 2 ground station, $P_{w2t}$, are computed by:

$$\alpha_2 = \text{ARCTAN}\,[\,|\lambda_2 - \lambda_t|\,/\,|\phi_2 - \phi_t|\,\cos\lambda_2]$$
$$R_{c2} = R_E + (R_N - R_E)\frac{\alpha_2}{\pi/2}$$
$$P_{w2t} = [2\cdot R_{C2}\cdot(h_2 - (h_t + P^a_{wt})) + (h_2 - (h_t + P^a_{wt}))^2 - (D^a_{20})^2]/[2\cdot(R_{c2} + (h_t + P^a_{wt}))]\,P^2_{wt}$$

b. The sides of the projected triangle of FIG. 10 are computed by:

$$S_X = \sqrt{(P^b_{ut} - P^a_{ut})^2 + (P^b_{vt} - P^a_{vt})^2}$$
$$S_Y = \sqrt{(D^b_{20})^2 - (P_{w2t} - P^b_{wt})^2}$$
$$S_Z = \sqrt{(D^a_{20})^2 - (P_{w2t} - P^a_{wt})^2}$$

c. Angles η and ψ of FIG. 11 are computed by:

$$\eta = \text{TAN}^{-1}\{(P_{vt}{}^b - P_{vt}{}^a)/(P_{ut}{}^b - P_{ut}{}^a)\}$$

$$\psi = \text{COS}^{-1}\{(S_x{}^2 + S_z{}^2 - S_y{}^2)/2S_xS_z\}$$

d. By definition:
$$\xi_1 = \eta + \psi$$
$$\xi_2 = \eta - \psi$$

e. An initial value of $P_{u2t}$, denoted by $PP_{u2t}$, is computed by:

$$PP_{u2t} =$$
$$[(R_{C2} + h_t)\,\text{COS}\,\lambda_t\,\text{COS}\,\phi_t - (R_{C2} + h_2)\text{COS}\,\lambda_2\,\text{COS}\,\phi_2]$$
$$\quad \text{SIN}\,\lambda_t\,\text{COS}\,\phi_t$$
$$[(R_{C2} + h_t)\,\text{COS}\,\lambda_t\,\text{SIN}\,\phi_t - (R_{C2} + h_2)\text{COS}\,\lambda_2\,\text{SIN}\,\phi_2]$$
$$\quad \text{SIN}\,\lambda_t\,\text{SIN}\,\phi_t$$
$$- [(R_{C2} + h_t)\,\text{SIN}\,\lambda_t - (R_{c2} + h_2)\,\text{SIN}\,\lambda_2]\,\text{COS}\,\lambda_t$$

In order to resolve the quadrant ambiguity of the slot 2 ground station location the OCP makes the following comparison:

if $|(S_z \cos \xi_1 + P_{ut}{}^a) - PP_{u2t}| < |(S_z \cos \xi_2 + P_{ut}{}^a) - PP_{u t2}|$ then the OCP sets $P_{u2t} = S_z \cos \xi_1 + P_{ut}{}^a$ otherwise it sets $P_{u2t} = S_z \cos \xi_2 + P_{ut}{}^a$ f. Next an initial value of $P_{v2t}$, denoted by $PP_{v2t}$, is computed by:

$$PP_{v2t} = [(R_{c2} + h_t)\text{COS}\,\lambda_t\,\text{COS}\,\phi_t -$$
$$(R_{c2} + h_2)\,\text{COS}\,\lambda_2\,\text{COS}\,\phi_2]\,\text{SIN}\,\phi_t -$$
$$[(R_{c2} + h_t)\text{COS}\,\lambda_t\,\text{SIN}\,\phi_t -$$
$$(R_{c2} + h_2)\,\text{COS}\,\lambda_2\,\text{SIN}\,\phi_2]\,\text{COS}\,\phi_t$$

Following this the OCP makes the following comparison:

if $|(S_z{}'\ \text{SIN}\ \xi_1 + P_{vt}{}^a) - PP_{v2t}| < |(S_z{}'\ \text{SIN}\ \xi_2 + P_{vt}{}^a) - PP_{v2t}|$ it then sets $P_{v2t} = S_z \cdot \text{SIN}\ \xi_1 + P_{vt}{}^a$ otherwise, it sets $P_{v2t} = S_z \cdot \text{SIN}\ \xi_2 + P_{vt}{}^a$ The same procedure is followed for the other ground station to compute $P_{u3t}$, $P_{v3t}$, $P_{w3t}$ using $D_{30}{}^a$, $D_{30}{}^b$.

The following equations are then used to compute $\lambda_o$, $\phi_o$ for the grid origin assigned by the OCP. The equations are written as if the slot 2 ground station were defined as the origin, it being understood that a similar set of equations could be derived for whatever ground station is selected as origin:

$$\Delta X = P_{w2t}\,\text{COS}\,\lambda_t\,\text{COS}\,\phi_t - P_{v2t}\,\text{SIN}\,\phi_t - P_{u2t}\,\text{SIN}\,\lambda_t\,\text{COS}\,\phi_t$$
$$\Delta Y = P_{w2t}\,\text{COS}\,\lambda_t\,\text{SIN}\,\phi_t + P_{v2t}\,\text{COS}\,\phi_t - P_{u2t}\,\text{SIN}\,\lambda_t\,\text{SIN}\,\phi_t$$
$$\Delta Z = P_{w2t}\,\text{SIN}\,\lambda_t + P_{u2t}\,\text{COS}\,\lambda_t$$
$$X_2 = \Delta X + (R_{C2} + h_t)\,\text{COS}\,\lambda_t\,\text{COS}\,\phi_t \quad \text{Earth centered rotating coordinates of ground station 2}$$
$$Y_2 = \Delta Y + (R_{C2} + h_t)\,\text{COS}\,\lambda_t\,\text{SIN}\,\phi_t$$
$$Z_2 = \Delta Z + (R_{C2} + h_t)\,\text{SIN}\,\lambda_t$$

$$\lambda_O = \text{SIN}^{-1}\frac{Z_2}{\sqrt{X_2{}^2 + Y_2{}^2 + Z_2{}^2}}$$

$$\phi_O = \text{TAN}^{-1}\left(\frac{Y_2}{X_2}\right)$$

From the time at which the grid definition procedure is initiated at point $C_a$, the OCP hybrid navigation subsystem of the controller aircraft is navigating in temporary relative grid coordinates $P_{ut}$, $P_{vt}$, $P_{wt}$. Following receipt of an indication from the relative grid definition computations that grid definition is complete and prior to the first Kalman cycle update following point $C_b$ on the controller's trajectory, the OCP must transfer the hybrid navigation equations of the controller to the new relative grid. The OCP first calculates the transformation matrix [G] at $\lambda_o$ and $\phi_o$, the final relative grid origin.

$$[G_o] = \begin{bmatrix} -\text{SIN } \lambda_o \text{ COS } \phi_o & -\text{SIN } \phi_o & \text{COS } \lambda_o \text{ COS } \phi_o \\ -\text{SIN } \lambda_o \text{ SIN } \phi_o & \text{COS } \phi_o & \text{COS } \lambda_o \text{ SIN } \phi_o \\ \text{COS } \lambda_o & 0 & \text{SIN } \lambda_o \end{bmatrix}$$

The OCP then zeroes $P_u$ and $P_v$ in the hybrid navigation state vector.

The controller's temporary relative grid coordinates $P_{ut}$, $P_{vt}$ and $P_{wt}$ are then transformed to their equivalent values in the new grid ($P_u$, $P_v$) by:

$$\begin{bmatrix} P_u \\ P_v \\ - \end{bmatrix} = [G_o]^T [G_T] \begin{bmatrix} P_{ut} - P_{u2t} \\ P_{vt} - P_{v2t} \\ P_{wt} - P_{w2t} \end{bmatrix}$$

where
$$[G_T] = \begin{bmatrix} -\text{SIN } \lambda_t \text{ COS } \phi_t & -\text{SIN } \phi_t & \text{COS } \lambda_t \text{ COS } \phi_t \\ -\text{SIN } \lambda_t \text{ SIN } \phi_t & \text{COS } \phi_t & \text{COS } \lambda_t \text{ SIN } \phi_t \\ \text{COS } \lambda_t & 0 & \text{SIN } \lambda_t \end{bmatrix}$$

At this point the current values $\Delta P_u$ and $\Delta P_v$ in the state vector, accumulated after the relative grid position was reset to zero, are added to the above computation for $P_u$ and $P_v$ to yield the true relative grid coordinates of the controller.

$$P_u = \Delta P_u + P_u \mid \text{from computation}$$
$$P_v = \Delta P_v + P_v \mid \text{from computation}$$

Following controller grid definition, acquisition and transformation, the OCP determined grid origin $\lambda_o$, $\phi_o$ and $\delta$ (if computed) is transmitted in the TSRS message with the Controller's new grid position data. Also transmitted would be the grid status bits of the data message which would indicate valid grid data, offset defined grid option and $\delta$ valid if computed.

B. Local Grid Definition. In this mode, the OCP initiates the relative grid upon receipt of a command from the CP,152. For this case, the grid definition and controller acquisition are accomplished by reinitialization of $P_u$ and $P_v$ in the hybrid navigation state vector and changes to $\beta$ at the frst Kalman update time after grid definition command. For this case the latitude and longitude coordinates of the aircraft, at the time $P_u$ and $P_v$ are reinitialized, become the defined relative grid origin with grid altitude assumed at sea level. All future computations are based upon new grid origin and relative grid position. Following grid definition and hybrid navigation subsystem reset, the OCP transmits, via the TSRS message, the determined grid origin and Controller's relative grid coordinates. Also, the grid status bits in the message indicate valid grid data, local defined grid option, and $\delta$ invalid.

C. User Grid Acquisition. The acquisition of the relative grid by the OCP when designated as a user may be done in either the TSRS acquisition mode or the Inertial acquisition mode. The TSRS acquisition mode requires range from two stations to be available. The choice of modes is optional, subject to the following restrictions. Passive mode acquisition is always done using the Inertial option, as is the case where no ground stations are used (all airborne case). The user TSRS grid acquisition option is only used when at least two cooperative and valid TSRS ranging stations are available. Slot 2 and slot 3 ground stations are used if available. As indicated, the TSRS grid acquisition option may not be used in a passive mode.

C. (1) User TSRS Grid Acquisition. The data required for user grid acquisition option includes the grid origin coordinates ($\lambda_o$, $\phi_o$) and grid use status from the TSRS message from the Controller. If the Controller's range data is to be utilized, his relative grid coordinates at the time of ranging are also required. If the indicated grid use status indicates that group stations may not be used or that no grid has yet been established, the user acquisition option is not executed by the OCP. The computation for TSRS grid coordinates parallels that for the computation of the temporary grid coordinates $P_{u2t}$, $P_{v2t}$, $P_{w2t}$ described previously. The geometric relationships and definition of terms are shown in FIG. 11. At the grid initialization command from the CP, the OCP resets the hybrid navigation relative grid state vector elements. Also, hybrid navigation geographic position $\lambda$, $\phi$, h are saved at this time. The following data is obtained from one of the TSRS cycles after reset:

a. Ranges $D_{21}^d$ and $D_{31}^d$ or $D_{01}^d$ (Controller to User range) are saved for use in the acqusition computations.

b. Relative grid positions $P_u^d$, $P_v^d$.

The following data are obtained from the next subsequent TSRS cycle:

a. Range $D_{21}^e$ is saved for use in the acquisition computations.

b. Relative grid positions $P_u^e$, $P_v^e$.

Following accumulation of the preceding data, the following computations are made:

Compute $P_w^d$ and $P_w^e$ by:

$$P_w^d = \left[ \frac{(R_E + R_N)(h - h_2) + (h^2 - h_2^2) - D_{21}^{d\,2}}{(R_E + R_N + 2h_2)} \right] + P_{w2}$$

$$P_w^e = \left[ \frac{(R_E + R_N)(h - h_2) + (h^2 - h_2^2) - D_{21}^{e\,2}}{(R_E + R_N + 2h_2)} \right] + P_{w2}$$

(C) Compute the sides of the projected triangle of FIG. 11 by:

$$S_x = \sqrt{P_{u3}^2 + P_{v3}^2}$$

$$S_y = \sqrt{(D_{31}^d)^2 - (P_w^d - P_{w3})^2}$$

$$S_z = \sqrt{(D_{21}^d)^2 - (P_w^d - P_{w2})^2}$$

(C) Compute angles $\eta$ and $\psi$ of FIG. 11 by:

$$\eta = \text{TAN}^{-1} \{P_{v3}/P_{u3}\}$$

$$\psi = \text{COS}^{-1} \{(S_x^2 + S_z^2 - S_y^2)/2 \cdot S_x \cdot S_z\}$$

(C) By definition:
$$\xi_1 = \eta + \psi$$

$$\xi_2 = \eta - \psi$$

(C) Compute an initial value of $P_u$ denoted by $PP_u$ by:

$$PP_u = \left[\left(\frac{R_E + R_N}{2} + h_o\right) \cos \lambda_o \cos \phi_o - \left(\frac{R_E + R_N}{2} + h\right) \cos \lambda \cos \phi\right] \sin \lambda_o \cos \phi_o$$

$$+ \left[\left(\frac{R_E + R_N}{2} + h_o\right) \cos \lambda_o \sin \phi_o - \left(\frac{R_E + R_N}{2} + h\right) \cos \lambda \sin \phi\right] \sin \lambda_o \sin \phi_o$$

$$- \left[\left(\frac{R_E + R_N}{2} + h_o\right) \sin \lambda_o - \left(\frac{R_E + R_N}{2} + h\right) \sin \lambda\right] \cos \lambda_o$$

(C) The OCP then makes the following comparisons and if $$|S_z \cos \xi_1 - PP_u| < |S_z \cos \xi_2 - PP_u|$$

it sets
$$P_u = S_z \cos \xi_1$$

Otherwise, it sets $P_u = S_z \cos \xi_2$ (C) Compute an ititial value of $P_v$, denoted by $PP_v$ by:

$$PP_v = \left[\left(\frac{R_E + R_N}{2} + h_o\right) \cos \lambda_o \cos \phi_o - \left(\frac{R_E + R_N}{2} + h\right) \cos \lambda \cos \phi\right] \sin \phi_o$$

$$- \left[\left(\frac{R_E + R_N}{2} + h_o\right) \cos \lambda_o \sin \phi_o - \left(\frac{R_E + R_N}{2} + h\right) \cos \lambda \sin \phi\right] \cos \phi_o$$

(C) The OCP then determine the following:
If $|S_z \sin \xi_1 - PP_v| < |S_z \sin \xi_2 - PP_v|$
it sets
$$P_v = S_z \sin \xi_1$$

Otherwise, it sets $P_v = S_z \sin \xi_2$

C. (2) User Inertial Acquisition. In this mode, only the users' apriori estimate of latitude, longitude, and altitude ($\lambda$, $\phi$, h) together with relative grid origin coordinates ($\lambda_o$, $\phi_o$) and angle are required. No range data is processed for initial grid positioning. At the first Kalman cycle update time following the grid initialization command from the CP, the OCP resets the hybrid navigation relative grid state vector elements. At the time of reset of $P_u$ and $P_v$, the geographic coordinates $\lambda$, $\phi$, h are saved.

The following computation procedure follows the above data taking:

Using the angle $\delta$ from the Controller's data message, the OCP determines the ground station relative grid coordinates. This computation is performed by the OCP only if the grid use status from the TSRS data message indicates that ground stations may be used.

(1) The OCP computes the incremental ECR coordinates of the grid origin position and the user's estimated geographic position $\lambda$, $\phi$, h from the above relative grid state reset time.

$$\Delta X = \left(\frac{R_E + R_N}{2} + h\right) \cos \lambda \cos \phi - \left(\frac{R_E + R_N}{2} + h_o\right) \cos \lambda_o \cos \phi_o$$

$$\Delta Y = \left(\frac{R_E + R_N}{2} + h\right) \cos \lambda \sin \phi - \left(\frac{R_E + R_N}{2} + h_o\right) \cos \lambda_o \sin \phi_o$$

$$\Delta Z = \left(\frac{R_E + R_N}{2} + h\right) \sin \lambda - \left(\frac{R_E + R_N}{2} + h_o\right) \sin \lambda_o$$

The user's grid coordinates at reset time are computed by:

$$\begin{bmatrix} P_u \\ P_v \\ - \end{bmatrix} = [G_O]^T \begin{bmatrix} \Delta X \\ \Delta Y \\ \Delta Z \end{bmatrix}$$

Where $[G_O]^T = $ $$\begin{bmatrix} -\sin \lambda_o \cos \phi_o & -\sin \phi_o & \cos \lambda_o \cos \phi_o \\ -\sin \lambda_o \sin \phi_o & \cos \phi_o & \cos \lambda_o \sin \phi_o \\ \cos \lambda_o & 0 & \sin \lambda_o \end{bmatrix}^T$$

If a passive mode has been commanded by the CP, the following data is also obtained. This data is utilized in the computations of initial user clock bias ($B_c$).

TOA$^f$ and Controller indicated relative grid positions $P_{uo}{}^f$, $P_{vo}{}^f$, $P_{wo}{}^f$.

Relative grid positions $P_u{}^f$, $P_v{}^f$, $P_w{}^f$.

The following data is obtained from one of the subsequent TSRS cycles.

a. TOA$_o{}^g$ and Controller indicated relative grid positions $P_{uo}{}^g$, $P_{vo}{}^g$, $P_{wo}{}^g$.

b. Relative grid positions $P_u{}^g$, $P_v{}^g$, $P_w{}^g$.

The computation procedure, following a. and b., proceeds as follows:

The user's initial clock bias is computed by:

$$B_C = TOA^f - \sqrt{(P_u{}^f - P_{uo}{}^f)^2 + (P_v{}^f - P_{vo}{}^f)^2 + (P_w{}^f - P_{wo}{}^f)^2}$$

5. Hybrid Navigation and Kalman Filtering With Observations. At Kalman filter update times a series of computations are performed to update the state vector elements and covariance matrix statistical model with observation information from TSRS. The update is scheduled by the OCP to occur once per Kalman cycle. If no observations are available or if updating is not desired at this scheduled update time, as indicated by the CP navigation mode switch not in the ITNS mode position, the filter observation update is inhibited with no corrections made to the time propagating state vector and covariance matrix model. Following ground alignment all scheduled observation updates are inhibited until the first initial grid definition and acquisition computation has been initiated and completed. These update computations are performed within the time of one Kalman cycle prior to the next scheduled observation update time. In addition, observation updating is always inhibited during any subsequent grid definition or acquisition computation period including the first update scheduled immediately after completion of these computations.

At scheduled observation update times, the OCP, upon interrogation of the appropriate CP switch position, selects either a geographic update measurement vector based upon an input specified ground station slot number latitude and longitude, or a two element TSRS measurement vector from the TSRS data processing section. The TSRS measurement vector possesses two different forms depending on whether the OCP is in an active or passive mode as indicated by the CP and the size of the TSRS observation vector depends upon the number of cooperative TSRS stations available for processing. Thus, the various observation vectors capable of being processed (C) at OCP scheduled observation times are indicated below.

a. Geographic update $$\begin{bmatrix} \text{Aircraft latitude} \\ \text{Aircraft longitude} \end{bmatrix}$$

b. Passive TSRS update (two or more stations available)

$$\begin{bmatrix} \text{TOA difference between aircraft TSRS and two other TSRS stations} \\ \text{TOA between aircraft TSRS and one additional TSRS station} \end{bmatrix}$$

c. Passive TSRS update (one station available)

$$\begin{bmatrix} \text{TOA between aircraft TSRS and one TSRS station} \end{bmatrix}$$

d. Active TSRS update (two or more stations available)

$$\begin{bmatrix} \text{TOA between aircraft TSRS and one TSRS station} \\ \text{TOA between aircraft TSRS and one additional station} \end{bmatrix}$$

e. Active TSRS update (one station available)

$$\begin{bmatrix} \text{TOA between aircraft TSRS and one TSRS station} \end{bmatrix}$$

Consistent with the measurement vector selection made above, the OCP computes an extrapolated measurement vector based upon the time propagated state vector extrapolated to the specific true observation times. This extrapolated measurement represents the hybrid navigation subsystem's best estimate of the true observation prior to observation update.

The OCP statistically weighs the differences between the true and extrapolated observation vectors to determine the correction to be made to the filter state vector. This weighing is performed by the filter gain matrix which is computed as a function of an observation transformation matrix, observation covariance matrix, and the time propagated state vector covariance matrix. Thus, this weighing is accomplished in a maximum liklihood sense as a function of time, flight trajectory, observation noise, and uncertainties in the initial value of the state vector. The observation transformation matrix determination reflects the results of the measurement vector selection made above. In addition, relative grid initialization computed data with respect to appropriate ground station relative grid coordinates is required. Due to the time phasing of the transition matrix with the observation data, the Kalman gains are also time synchronized to apply at the time the true observation is taken.

The OCP utilizes the computed filter gain matrix to determine corrections to each of the thirteen state vector elements by weighing the difference between the selected observation vector and extrapolated observation vector. In this weighing, the gain matrix represents the statistical weight to be assigned to elements of the above difference observation vector in the determination of state vector corrections. This assigned weight is dependent upon the filter's relative confidence in its present estimate of each element in the state vector together with its apriori knowledge of observation notice. The state vector corrections determined above must be corrected for the required OCP computation time from observation update initiation, prior to being added as corrections to each of the respective thirteen state vector elements. Compensation is made for the effect of these corrections on the relative grid position and velocity used with the observation data for the next Kalman update.

Following computation of the filter gain matrix, the OCP then updates the covariance matrix to account for the increased confidence in accuracy obtained due to the use of observation data. Thus, the covariance matrix represents an indication of how the estimated state is converging to the true state as a function of time and processed observations.

Referring again to FIG. 3 of the drawings, it is seen that a display and control panel 152 is shown interfacing with the digital computer 25. The control panel serves as the focal point of manual controls for executing the appropriate set of mode commands hereinbefore discussed. Accordingly, it serves as the primary source of "real time" communication between the computer and the system operator. The inertial measuring unit constants previously discussed, such as gyro and accelerometer biases and scale factors, for example, are entered in the memory of computer 25 through appropriate data entry switches (not shown). The various system operational modes are also selected by the operator or pilot on the control panel 152. In addition to its parameter and mode selection features, the control panel 152 also has the capability of displaying the various geographic and relative grid parameters outputted by the operational computer program. The display techniques utilized will, of course, depend upon the particular application to which the navigation system of the invention is put, the form of the outputted data, and other considerations, such as size and weight limitations, for example.

Figure 12:
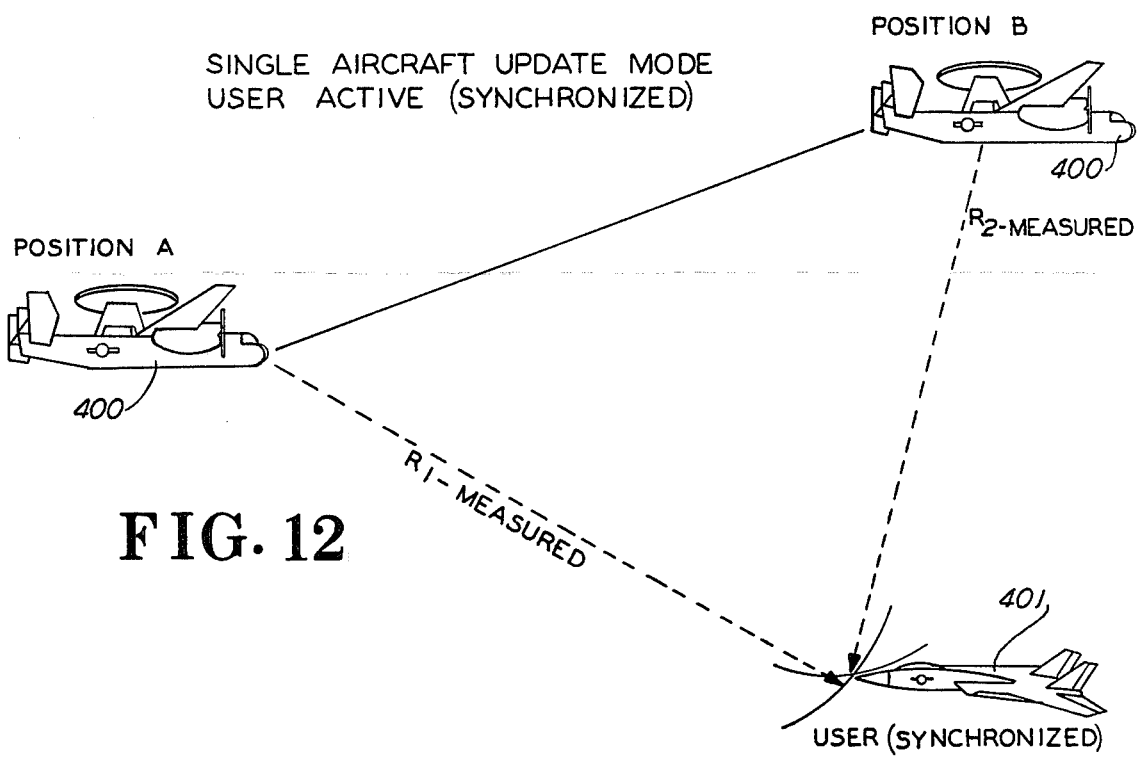
FIG. 12 is a schematic diagram illustrating the single aircraft update mode of operation of the system of the invention with the user active.
Figure 13:
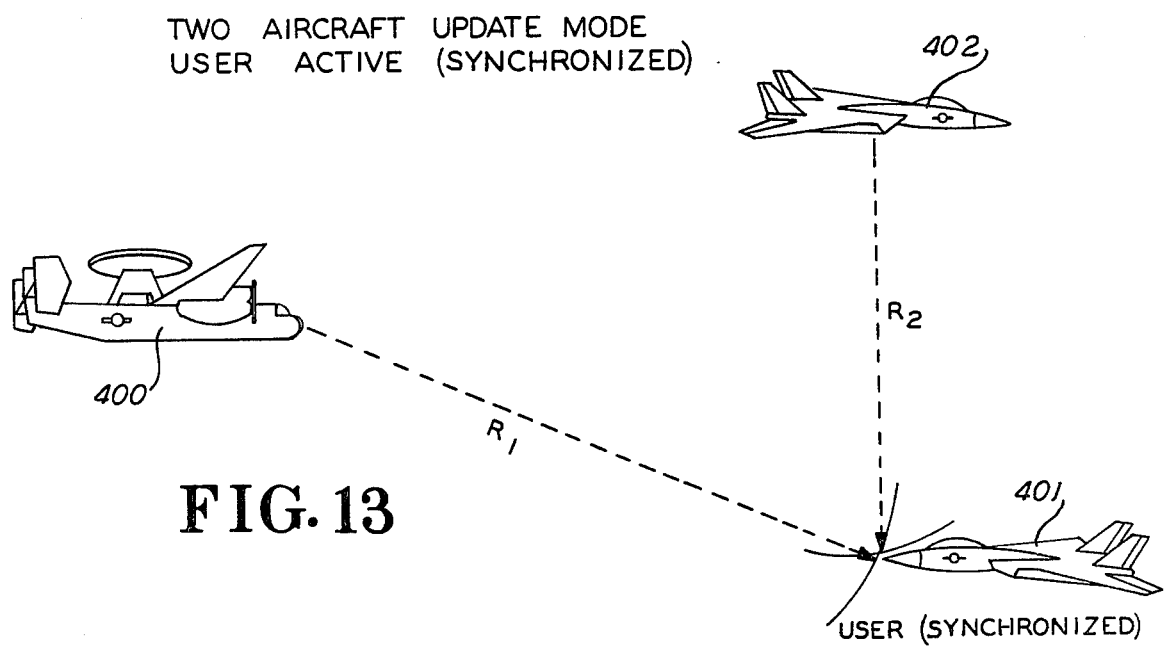
FIG. 13 is a schematic diagram illustrating the two aircraft update mode of operation of the system of the invention with the user active.

Two possible modes of operation of aircraft in a tactical community utilizing the navigation system of the invention are shown in FIGS. 12 and 13 of the drawings. FIG. 12 of the drawings illustrates the single aircraft update mode where the user aircraft is active and its TSRS is synchronized with the TSRS of the control aircraft. When a control aircraft 400 is at position A in the drawing, its TSRS system transmits a ranging Barker signal to a user aircraft 401. This signal may be the coarse synchronizing signal previously referred to which is transmitted by the control aircraft at the beginning of each complete system cycle. The user aircraft 401 computes its range $R_1$ to the control aircraft 400 by measuring the time of arrival of the transmitted ranging signal. When the particular time slot assigned to the user aircraft 401 is reached by the main timer of the user aircraft 401, the user transmits its fine sync request signal together with any desired serial data. The control aircraft 400 then computes its range $R_1$ to the user aircraft by measuring the time of arrival of the fine sync request signal. At this point, both the controller and user know the range separating them at Position A. The control aircraft 400 then transmits the fine sync reply signal which is also followed by serial data giving the relative grid origin coordinate information and any updated geographic coordinate information. When the control aircraft 400 reaches position B in the drawing, the coarse sync signal is again transmitted to the user aircraft 401 and the user aircraft measures the time of arrival of this signal to determine the range $R_2$ to the control aircraft. The serial data information from computer 25 of the control aircraft is also again transmitted to the user aircraft and stored in the user's computer. When the user's time slot is reached, the user transmits the fine sync request signal which is then utilized by the control aircraft to measure the range $R_2$ to the user. At this point, both the control aircraft and user aircraft know the range $R_2$. The user aircraft 401 now has two range measurements, $R_1$ and $R_2$, to be used in determining its position in the relative grid with respect to the control aircraft 400. Similarly, the control aircraft 400 is able to learn the position of the user in the relative grid. By means of the serial data transmissions from the control aircraft, the computer 25 of the user aircraft is given the relative grid origin and positional coordinates, so that the user's position in the grid is known. At the same time, the serial data transmission may provide georeferenced information to update the user's inertial navigation-derived geographic grid coordinates. Although this mode of operation is the least accurate operating mode, it may have important application in some tactical missions where relative positions of the two aircraft are important. For example, such an arrangement could be effectively utilized for aircraft collision avoidance and station-keeping.

FIG. 13 of the drawings illustrates the second basic mode of operation wherein two user aircraft are employed in the user aircraft range measuring process. Again, the user aircraft are active and their TSRS clocks synchronized with the clock of the control aircraft 400. In this mode of operation, the user aircraft 401 measures its first range $R_1$ by means of the coarse sync-ranging Barker signal transmitted from the control aircraft 400. The second range measurement $R_2$, however, is obtained by measuring the time of arrival of the fine sync request signal transmitted by a second user aircraft 402. The user 401 would, of course, receive the usual serial data, such as relative grid coordinates and updated georeferenced information from the control aircraft 400, but would also receive the same information from ther user aircraft 402, since each user may be equipped to relay such information to every other user in the community. Since TSRS range measurements are made to two different locations and two different sources of navigational information are provided, this operating mode provides highly accurate transfer of georeferenced coordinate information and a highly accurate determination of the user position in the relative grid system. It will be apparent, of course, that either or both of the control aircraft 400 and the user aircraft 402 could be replaced by a TSRS ground station or stations to transmit the required information.

When TSRS ground stations are employed in the tactical community, it is believed apparent that the nagivation and communication system of the invention readily lends itself to use as a traffic control system for air fields and the like. The accurate positioning of each user aircraft in the relative grid system established would be particularly valuable in establishing and maintaining aircraft positions in the holding patterns used for air traffic control. It should also be pointed out that although the system of the invention has been disclosed with reference to a tactical community composed of aircraft, the navigation system could be employed for other types of land, water or air vehicles. For example, the system might be utilized for sea navigation or for space vehicles. Additionally, the control or user aircraft could be replaced by ships, land vehicles or other mobile ground stations.

It may be noted that when two or three aircraft are employed for making three TSRS range measurements, the range information computed would be relative grid positional information in two dimensions, such as the U axis and V axis of the relative grid coordinate system. Altitude or "up" axis information is derived from an altimeter or the inertial navigation system. If the three TSRS radio range measurements were obtained from ground TSRS stations, however, the slant range measurements to the stations would also enable a user aircraft to determine its position in a vertical or up axis for the relative grid. If four TSRS-equipped aircraft are employed to provide four TSRS range measurements to a user aircraft, the user would, of course, be able to determine its position in three relative grid axes.

Figure 14:
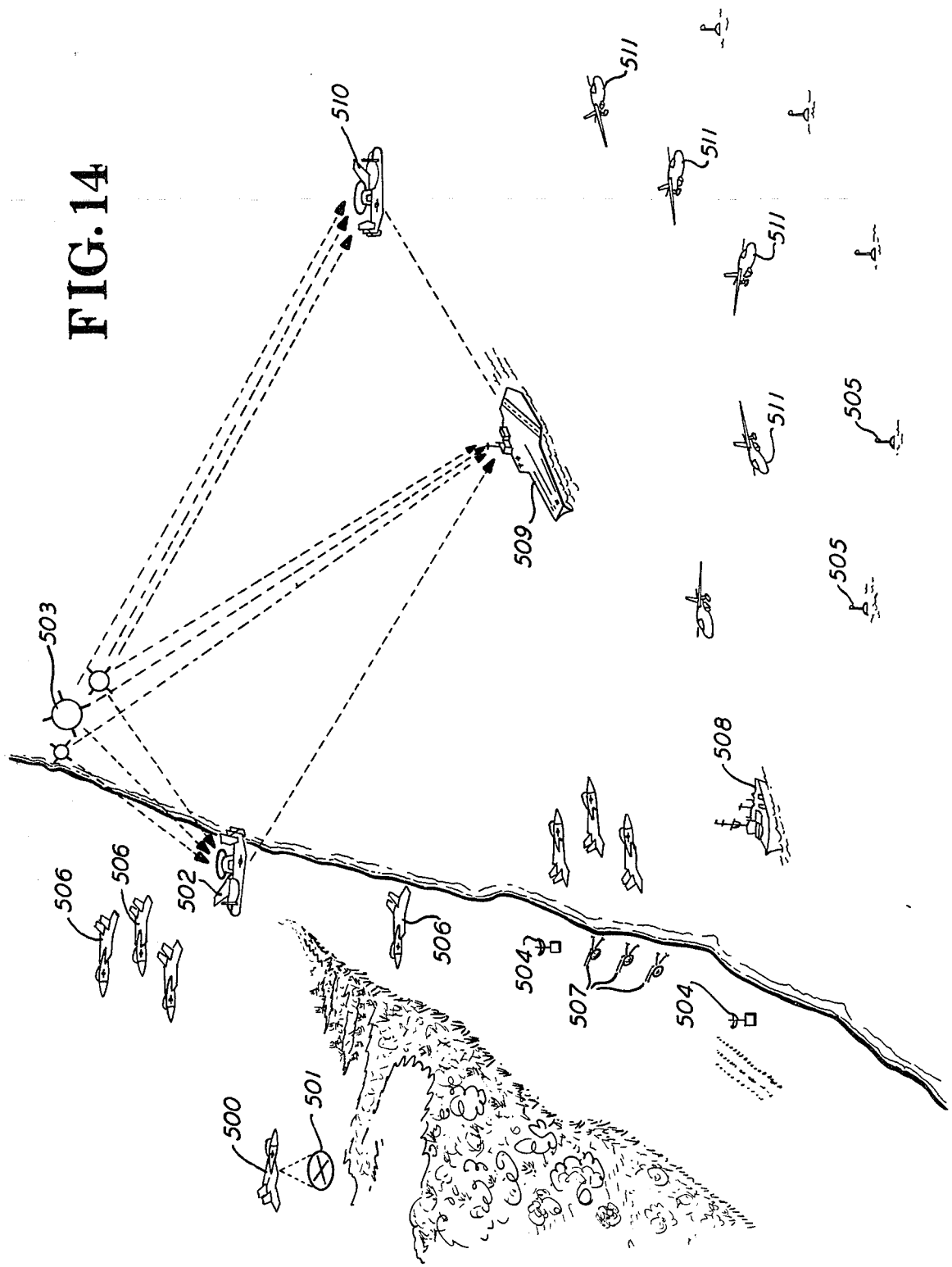
FIG. 14 is a shematic diagram illustrating the application of the tactical navigation and communication system of the invention to a frequently encountered military problem.

A basic application of the navigation and communication system of the invention to a frequently encountered military problem is illustrated in FIG. 14 of the drawings. In this application, it will be assumed that an aircraft 500 has overflown a "target of opportunity" indicated as 501. The pilot of the aircraft requests positioning and supplies target information to a control aircraft 502 by means of serial data transmissions from the TSRS equipment in aircraft 500. The control aircraft 502 immediately establishes a relative grid coordinate system and establishes the position of the aircraft 500 and the target of opportunity 501 in the relative grid system. The position of the user aircraft 500 and the target 501 can be established in the relative grid system with a very high degree of accuracy (on the order of tens of feet). The control aircraft 502 may be equipped to receive highly accurate georeferenced navigational information from a variety of sources, such as a satellite system 503, ground TSRS stations 504 and TSRS-equipped bouys 505. The control aircraft 502 may then elect to direct an attack on the target 501 by transmitting the relative grid coordinates of the target to various "strike" aircraft 506, previously positioned ground artillery 507, or an off-shore missile ship 508. The overall force commander could be located in an aircraft carrier 509 and would receive all of the necessary information pertaining to the location of the relative grid established by the control aircraft 502 by means of the serial data TSRS transmissions from that aircraft. The carrier 509 would also receive the relative grid coordinates of the target 501 and of each of the strike aircraft 506. During the course of receiving this information, the carrier 509 would be a passive user of the system and would not be required to produce any electromagnetic radiation which would reveal the position of the carrier to the enemy. In FIG. 14, a second control aircraft 510 is shown as receiving georeferenced positional information from the satellite system 503. This control aircraft could establish a second relative grid which would encompass a second community of user aircraft 511 which could be engaged in a different tactical mission. Accordingly, it will be noted that the navigation system of the invention permits any number of relative grids to be established through the use of a suitable number of control aircraft. In the system application illustrated in FIG. 14, the force commander in the carrier 509 could receive complete tactical information from a number of control aircraft engaged in a variety of different tactical missions.

It is believed apparent that many changes could be made in the construction and described uses of the foregoing tactical navigation and communication system and many seemingly different embodiments of the invention could be constructed without departing from the scope thereof. For example, the disclosed navigation system could utilize virtually all of the presently developed navigation sensing means and could also utilize such sensing means and systems as might be developed at a future date, thereby minimizing the problem of "technical obsolescence". It may also be noted that certain system details, such as the logic employed in the processing systems of the computer could be altered to suit particular navigation sensor configurations without departing from the scope of the invention. Accordingly, it is intended that all matter contained in the above description or shown in the accompanying drawings shall be interpreted as illustrative and not in a limiting sense.

We claim:

1. The method of navigation in a defined area for community of vehicles including a control vehicle and at least one user vehicle comprising the steps of:
    causing said control vehicle to establish a relative grid coordinate system covering the defined area;
    causing said control vehicle to transmit by radio relative grid origin and alignment data to each user vehicle;
    causing said control vehicle and each user vehicle to periodically establish their respective positions in the relative grid coordinate system by radio range measurements;
    navigating said control vehicle and each user vehicle by inertial navigation during the time periods between the periodic radio range measurements; and
    periodically updating the navigation information of each user vehicle by combining such inertial information with navigation information transmitted by radio by said control vehicle.

2. The method of navigation as claimed in claim 1 wherein
    the said navigation information radioed from the control vehicle is combined with the inertial navigation information in each user vehicle by computer programming using Kalman filter techniques.

3. The method of navigation as claimed in claim 2 wherein
    the inertial navigation information of the control vehicle is periodically updated by combining such inertial information with georeferenced navigation information sensed by said control vehicle to produce the navigation information radioed to each user vehicle.

4. The method of navigation as claimed in claim 3 wherein
    the said georeferenced navigation information is sensed by said control vehicle by making radio range measurements to radio range signal transmitting ground stations at known geographic locations.

5. The method of navigation as claimed in claim 3 wherein
    the said georeferenced navigation information is derived by said control vehicle from a satellite navigation system.

6. The method of navigation as claimed in claim 3 wherein
    the said georeferenced navigation information is derived by said control vehicle from a hyperbolic type of radio navigation system.

7. The method of navigation as claimed in claim 3 wherein
    the said georeferenced navigation information is derived by said control vehicle from a rho-theta type of radio navigation system.

8. The method of navigation as claimed in claim 3 wherein
    said control vehicle and each user vehicle are each assigned a unique time slot in a cyclically recurring series of sequential time slots, and
    the radio range measurements from each user vehicle to said control vehicle are made during the unique time slot assigned to that user vehicle.

9. The method of navigation as claimed in claim 8 wherein
    the said relative grid origin and alignment data transmitted to each user vehicle by the control vehicle are digitally encoded serial data radio transmissions made by the control vehicle during the unique time slot assigned to the control vehicle.

10. The method of navigation as claimed in claim 8 wherein
    the navigation information transmitted to each user vehicle by the control vehicle to update the inertially-derived navigational information of the user vehicle are digitally-encoded serial data
    radio transmissions made by the control vehicle during the unique time slot assigned to that user vehicle.

11. A navigation system for community of vehicles including a control vehicle and at least one user vehicle operating in a defined area comprising:
    computer means on said control vehicle programmed to establish a relative grid coordinate system covering a defined area;
    a time synchronized ranging system in said control vehicle and each user vehicle for making radio range measurements between each of said vehicles and for transmitting relative grid origin and alignment data from the control vehicle to each user vehicle comprising:

(1) means for generating a cyclically recurring series of sequential time slots;

(2) means for maintaining the series of sequential time slots generated by each user vehicle in synchronism with the series of sequential time slots generated by the control vehicle;

(3) means on each of said vehicles for transmitting digitally encoded radio ranging synchronism at a predetermined time during a different one of said time slots so that each of said vehicles has a unique time slot for such transmission, the transmission of said control vehicle transmitting said relative grid origin and alignment data as a digitally encoded serial data message following the radio ranging signal transmitted by the control vehicle during the unique time slot assigned to the control vehicle;

(4) means on each of said vehicles for receiving digitally encoded radio ranging signals transmitted from the remaining vehicles in said community during the unique time slots assigned to said remaining vehicles and measuring the time of arrival of each such received signal to determine the range between the receiving vehicles and each of said remaining vehicles;

(5) inertial navigation means in said control vehicle and each user vehicle for providing inertial navigation signals for navigating each vehicle in a geographic coordinate system;

(6) means in said time synchronized ranging system for transmitting the geographic grid information system of the control vehicle to each user vehicle;

(7) computer means on each user vehicle to update the inertial navigation system of the user vehicle with the geographic grid navigation information received from the control vehicle to provide hybrid navigation signals for the navigation of the user vehicles, whereby each user vehicle is provided with relative grid navigation information for navigation in the relative grid established by the control vehicle, and said control vehicle and each user vehicle may operate in either or both the relative grid and geographic grid coordinate systems.

12. A navigation system as claimed in claim 11 wherein
said control vehicle is provided with a source of georeferenced navigation signals, and
the computer means in the control vehicle is programmed by Kalman filter techniques to update the inertial navigation signals in the control vehicle with the georeferenced navigation signals to provide the said geographic grid navigation information which is transmitted to each user vehicle.

13. A navigation system as claimed in claim 12 wherein
time synchronized ranging system ground stations are provided at known geographic locations, and
the time synchronized ranging system in said control vehicle is the said source of georeferenced navigation signals.

14. A navigation system as claimed in claim 12 wherein
said source of georeferenced navigation signals is a satellite navigation system receiver in the control vehicle.

15. A navigation system as claimed in claim 12 wherein
said source of georeferenced navigation signals is a hyperbolic radio navigation system receiver in the control vehicle.

16. A navigation system as claimed in claim 12 wherein
the said geographic grid navigation information is transmitted from the control vehicle to each user vehicle as a digitally encoded serial data message during the unique time slot assigned to each user vehicle.

17. A navigation system as claimed in claim 16 wherein
the said radio ranging signals are serially transmitted digital signals encoded in a Barker code.

* * * * *